US012784577B2

(12) United States Patent
Hatsukari et al.

(10) Patent No.: US 12,784,577 B2
(45) Date of Patent: Nov. 3, 2026

(54) SENSOR DEVICE, SYSTEM, AND TRANSMISSION METHOD

(71) Applicant: SIGNTLE INC., Tokyo (JP)

(72) Inventors: Takuro Hatsukari, Tokyo (JP); Masato Tsuji, Tokyo (JP); Kazuki Kouke, Tokyo (JP); Hiroshi Nagaoka, Tokyo (JP); Izumi Sato, Tokyo (JP)

(73) Assignee: SIGNTLE INC., Tokyo (JP)

( * ) Notice: Subject to any disclaimer, the term of this patent is extended or adjusted under 35 U.S.C. 154(b) by 212 days.

(21) Appl. No.: 18/568,933

(22) PCT Filed: Mar. 22, 2022

(86) PCT No.: PCT/JP2022/013139

§ 371 (c)(1),
(2) Date: Dec. 11, 2023

(87) PCT Pub. No.: WO2022/264592

PCT Pub. Date: Dec. 22, 2022

(65) Prior Publication Data

US 2024/0273999 A1 Aug. 15, 2024

(30) Foreign Application Priority Data

Jun. 18, 2021 (JP) ................................ 2021-101709

(51) Int. Cl.
*G08C 17/02* (2006.01)

(52) U.S. Cl.
CPC .................................... *G08C 17/02* (2013.01)

(58) Field of Classification Search
CPC ........ G08C 17/02; G08C 17/00; G08B 25/04; G01D 7/00; H04M 11/00; H04Q 9/00; H04W 4/00; H04W 8/00; H04W 84/10
See application file for complete search history.

(56) References Cited

U.S. PATENT DOCUMENTS

2012/0182143 A1* 7/2012 Gaines ................. A61B 5/0022 340/539.12
2013/0015966 A1* 1/2013 Soomro ............... A61B 5/0006 340/539.12

(Continued)

FOREIGN PATENT DOCUMENTS

JP 9-247769 A 9/1997
JP 2010-232963 A 10/2010

(Continued)

OTHER PUBLICATIONS

International Search Report (PCT/ISA/210) issued in PCT/JP2022/013139, dated Jun. 7, 2022.

*Primary Examiner* — Adnan Aziz
(74) *Attorney, Agent, or Firm* — Birch, Stewart, Kolasch & Birch, LLP

(57) ABSTRACT

A sensor device 50 includes: an acquisition unit that acquires biological information on a subject; a communication unit that performs near field communication; and a controller, in which the controller determines whether the acquired biological information is specific biological information, transmits the biological information to a server device via the communication unit by way of a first terminal device 10 in a case where the biological information is the specific biological information, and transmits the biological information via the communication unit by broadcast in a case where the biological information is other than the specific biological information to transmit the biological information to the server device by way of an unspecified second terminal device 20.

9 Claims, 27 Drawing Sheets

(56) References Cited

U.S. PATENT DOCUMENTS

| | | | | |
|---|---|---|---|---|
| 2014/0187890 | A1* | 7/2014 | Mensinger | A61B 5/743<br>600/365 |
| 2015/0061825 | A1* | 3/2015 | Suzuki | H04W 4/21<br>340/5.52 |
| 2015/0264628 | A1* | 9/2015 | Wen | H04W 72/0446<br>370/315 |
| 2016/0182574 | A1* | 6/2016 | Kim | H04L 65/1069<br>709/227 |
| 2021/0327244 | A1* | 10/2021 | Nishikado | G08B 21/0407 |
| 2022/0038554 | A1* | 2/2022 | Merwaday | H04L 45/64 |
| 2022/0263899 | A1* | 8/2022 | Matsuo | G08G 1/01 |
| 2023/0346264 | A1* | 11/2023 | Hirai | G06F 3/011 |

FOREIGN PATENT DOCUMENTS

| | | | | |
|---|---|---|---|---|
| JP | 2014099770 | A | * | 5/2014 |
| JP | 2015-154920 | A | | 8/2015 |
| JP | 2017-41770 | A | | 2/2017 |
| JP | 2017-147643 | A | | 8/2017 |
| JP | 2020137019 | A | * | 8/2020 |

* cited by examiner

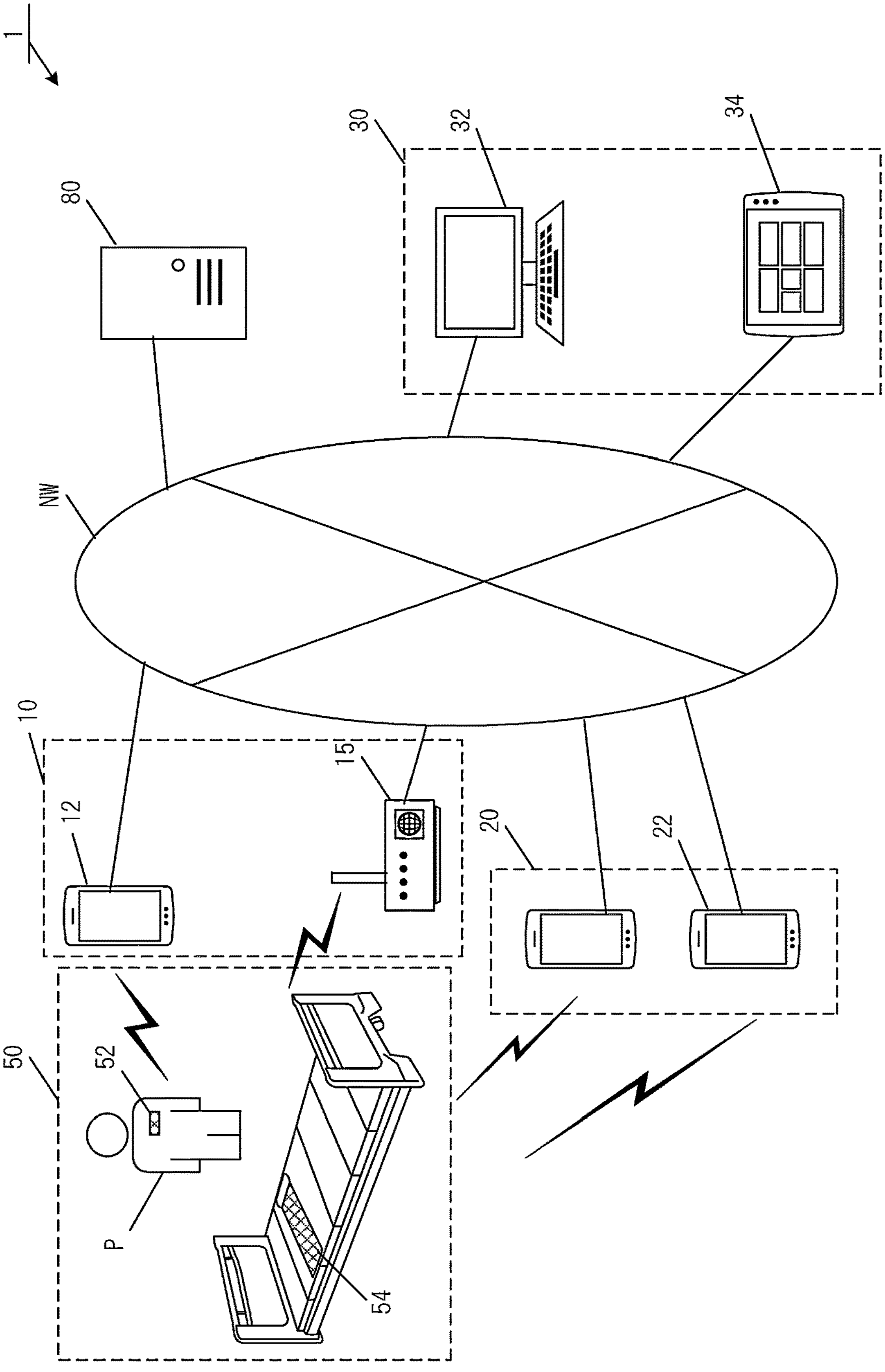
[Fig. 1]

[Fig. 2]
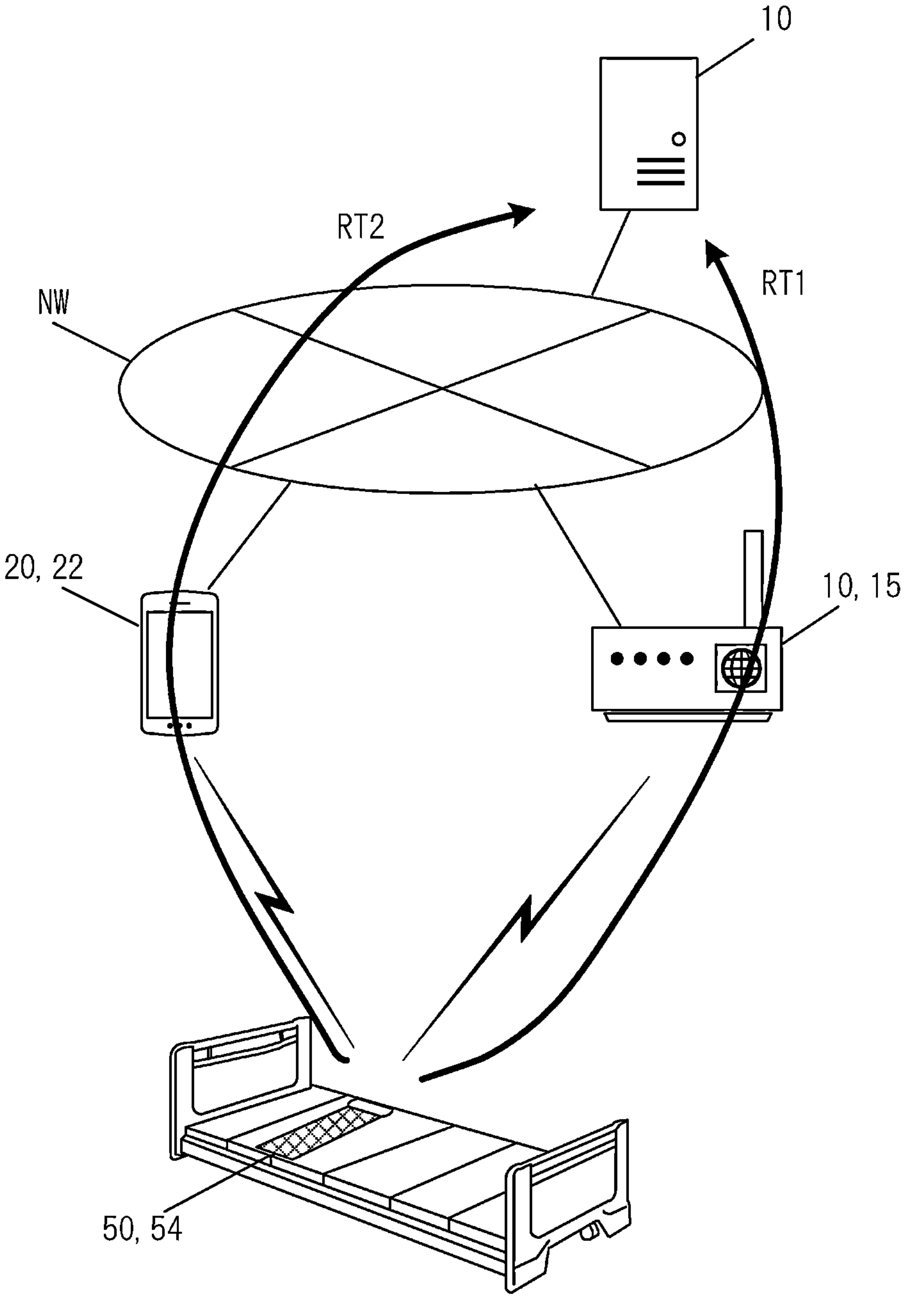

[Fig. 3]
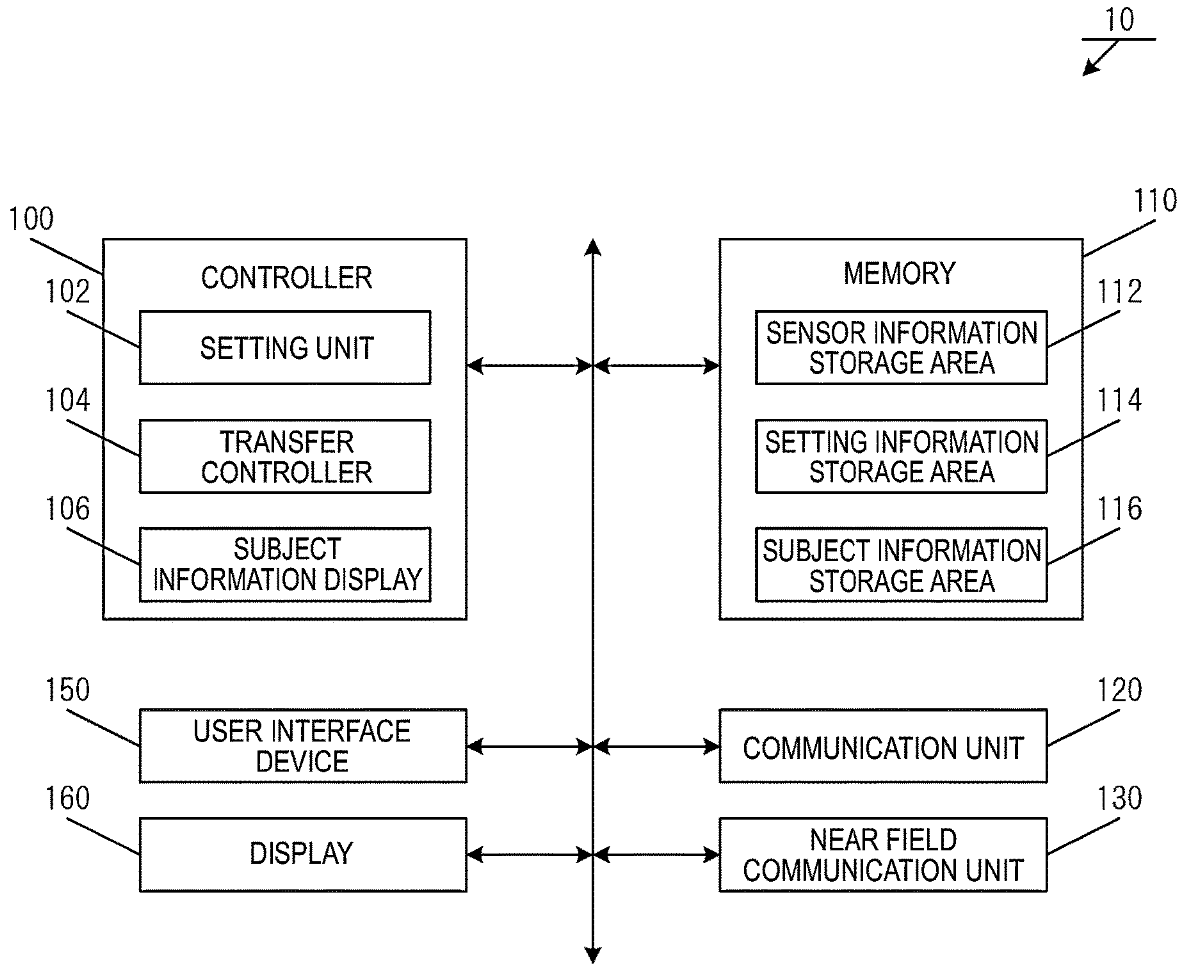

[Fig. 4]

(a)

| | |
|---|---|
| SENSOR DEVICE ID | 012-3456 |
| SUBJECT ID | 0001 |
| ACQUISITION DATE/TIME | 2021/06/01 23:10:15 |
| HEARTBEAT RATE | 80 |
| RESPIRATORY RATE | 12 |
| NOTE | DIFFICULTY IN FALLING ASLEEP |

(b)

| | |
|---|---|
| SENSOR DEVICE ID | 012-3456 |
| COMMUNICATION SCHEME | CONNECTION TYPE |
| INFORMATION TO BE ACQUIRED | HEARTBEAT RATE, RESPIRATORY RATE |
| ACQUISITION INTERVAL | 10 MINUTES |
| SUBJECT ID | 0001 |

[Fig. 5]
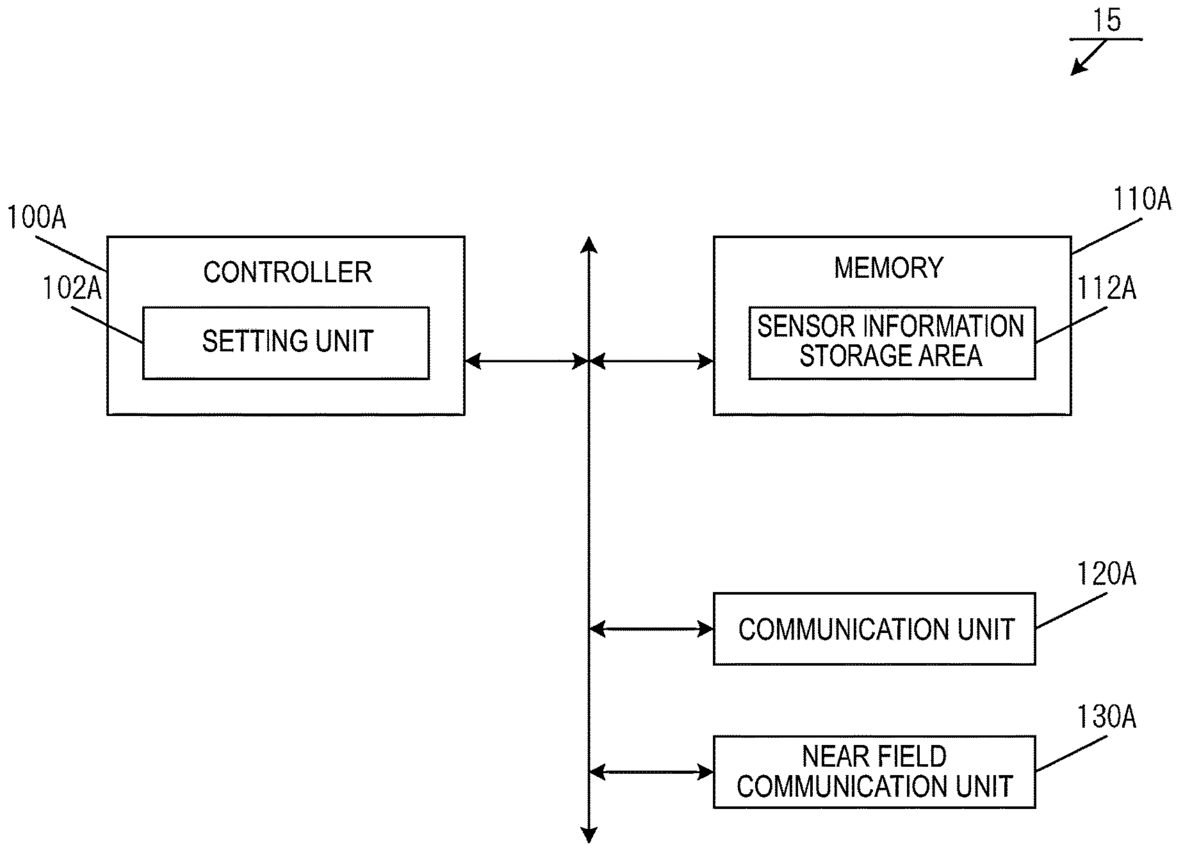

[Fig. 6]
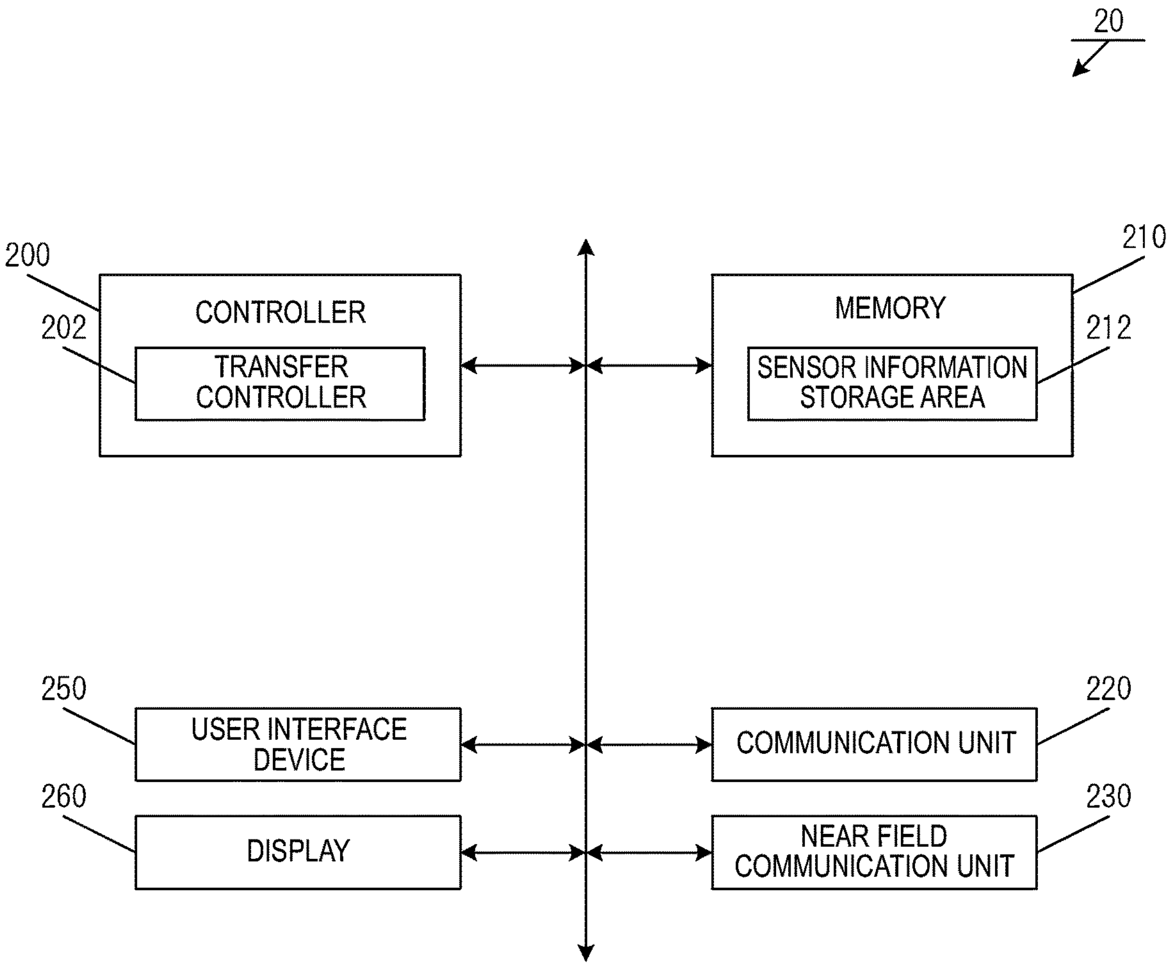

[Fig. 7]
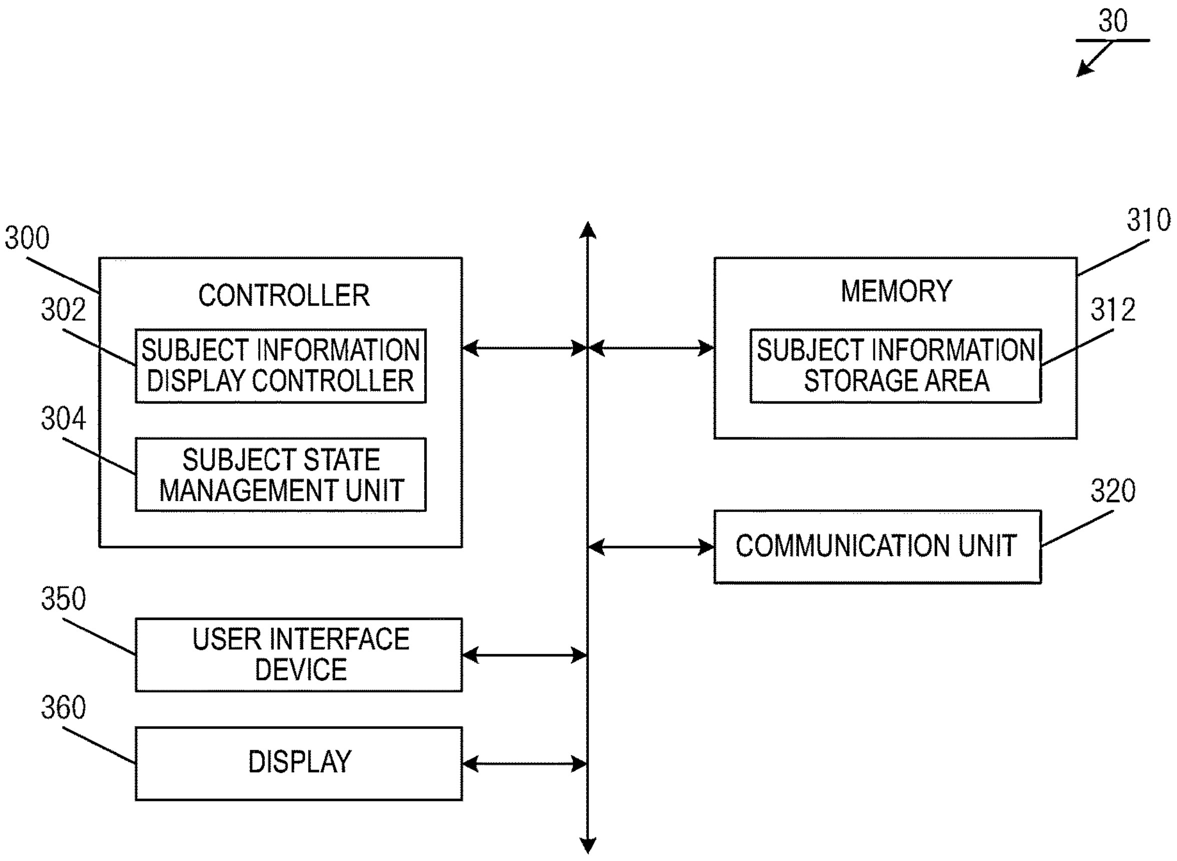

[Fig. 8]
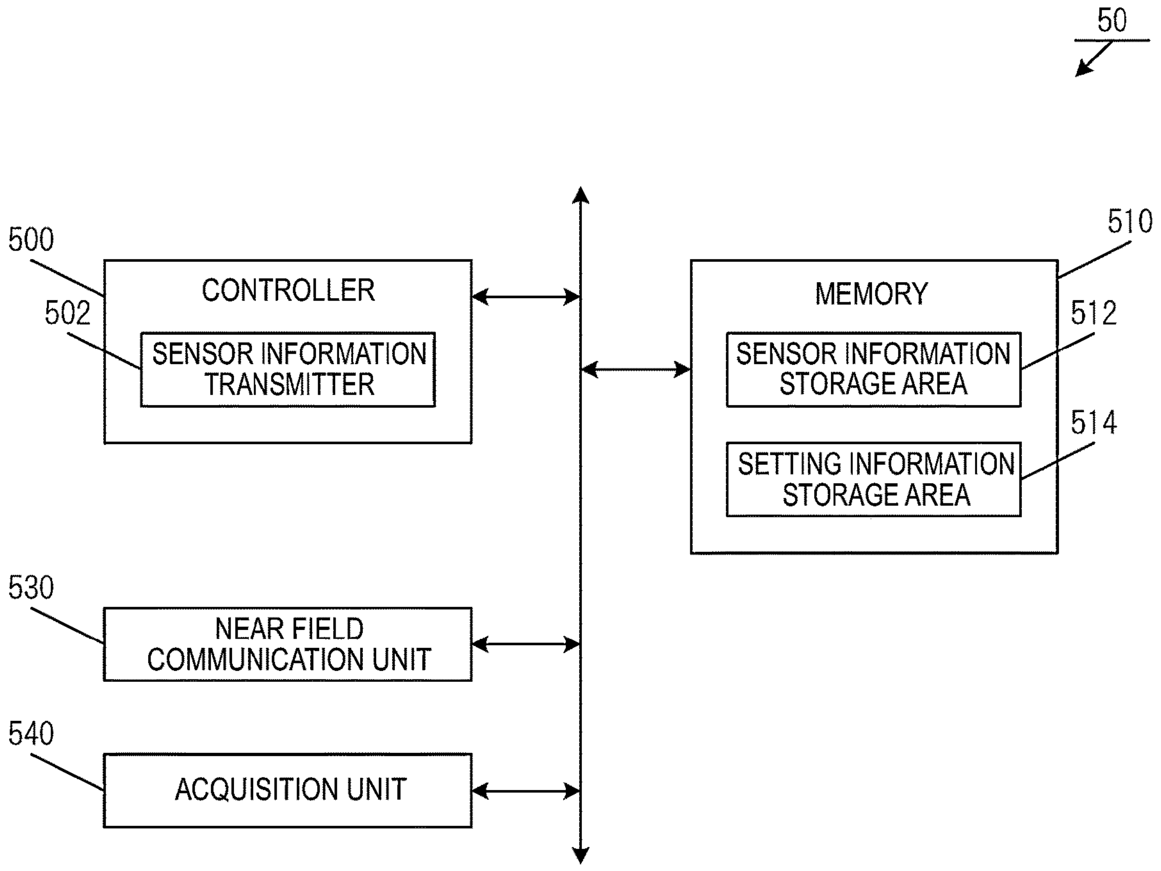
[Fig. 9]
| | |
|---|---|
| TRANSMISSION DESTINATION DEVICE ID | 325-44587 |
| COMMUNICATION SCHEME | CONNECTION TYPE |
| INFORMATION TO BE ACQUIRED | HEARTBEAT RATE, RESPIRATORY RATE |
| ACQUISITION INTERVAL | 10 MINUTES |

[Fig. 10]
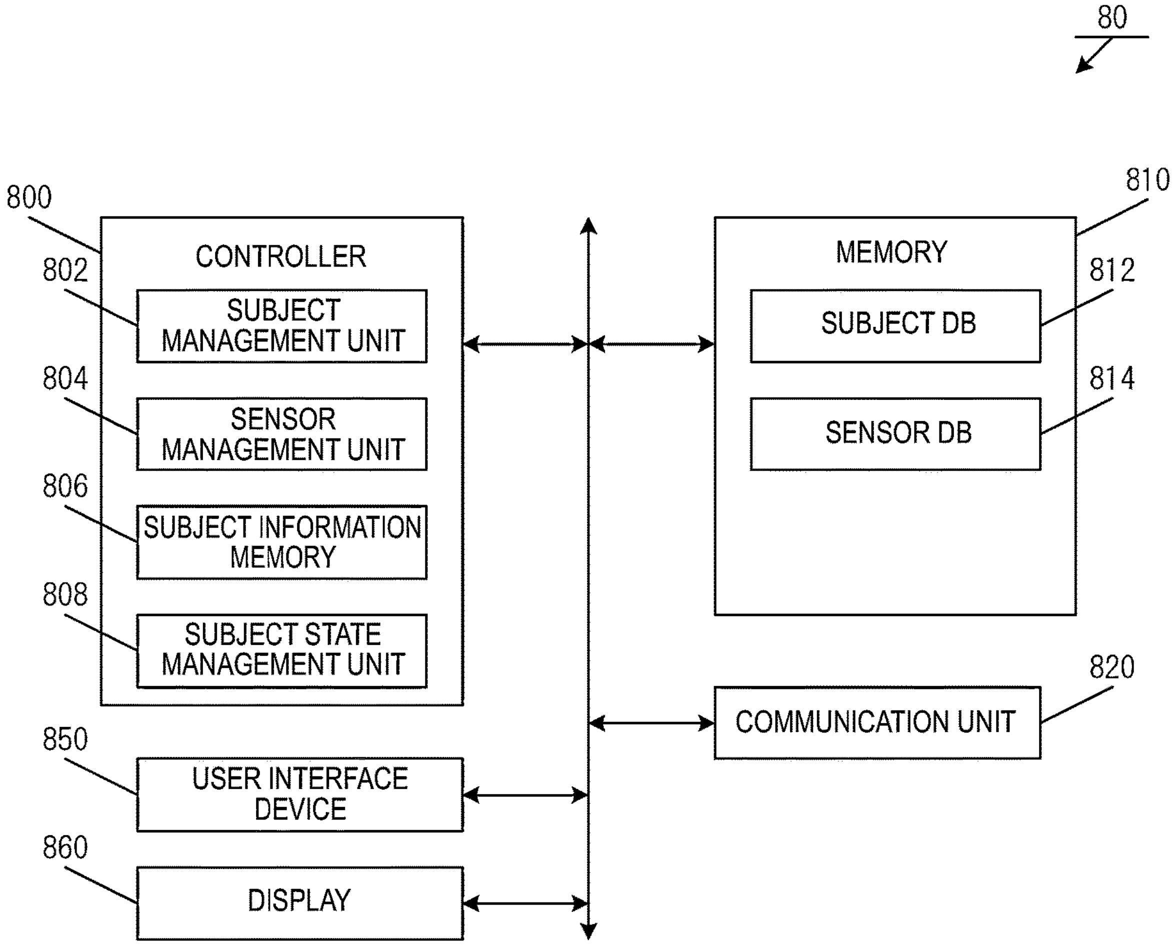

[Fig. 11]

| | |
|---|---|
| SUBJECT ID | 0001 |
| SUBJECT NAME | ARAYA Kazuki |
| EVACUATION SITE | ABC ELEMENTARY SCHOOL EVACUATION SITE |
| GROUP | A－3 |
| BASIC INFORMATION | PAST MEDICAL HISTORY OF DIABETES IS PRESENT. |
| SUBJECT INFORMATION 1 | 2021/06/01 22:00:00 HEARTBEAT RATE 80, RESPIRATORY RATE 10, BODY TEMPERATURE 36.7°C<br>2021/06/01 22:00:10 SLEEPING, SUPINE POSITION<br>: |
| SUBJECT INFORMATION 2 | 2021/06/01 SLEEP PERIOD 5.5 h<br>2021/06/01 AMOUNT OF ACTIVITY 65%<br>:<br>2021/06/02 SLEEP PERIOD 6.0 h<br>: |
| ⋮ | ⋮ |
| SUBJECT INFORMATION N | ⋮ |

[Fig. 12]

| SENSOR ID | SUBJECT ID |
|---|---|
| 012-3456 | 0001 |
| 012-3457 | 0002 |
| 125-4458 | 0001 |
| 0N11254 | 0001 |
| 00254876 | 0003 |

[Fig. 13]
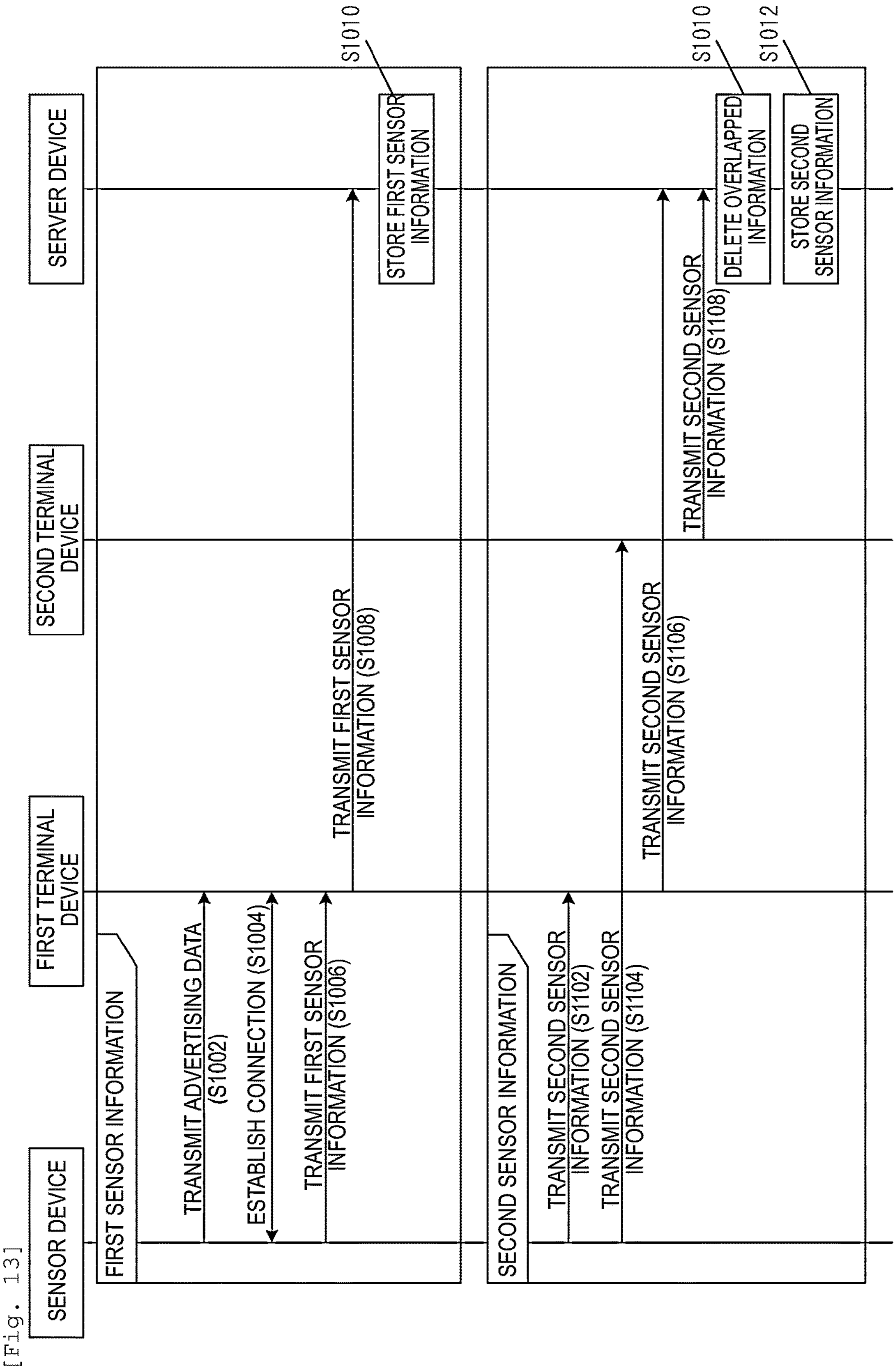

[Fig. 14]
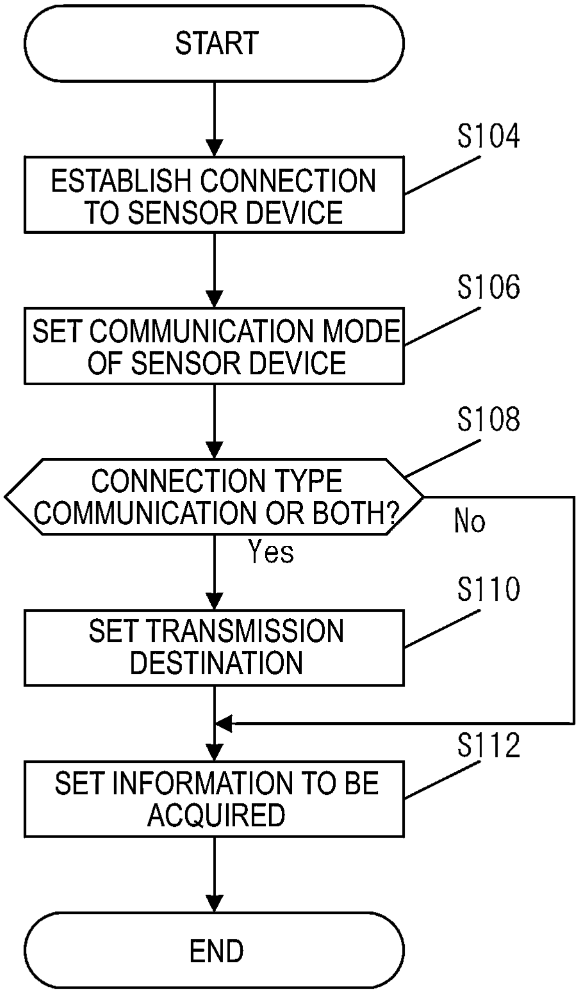

[Fig. 15]
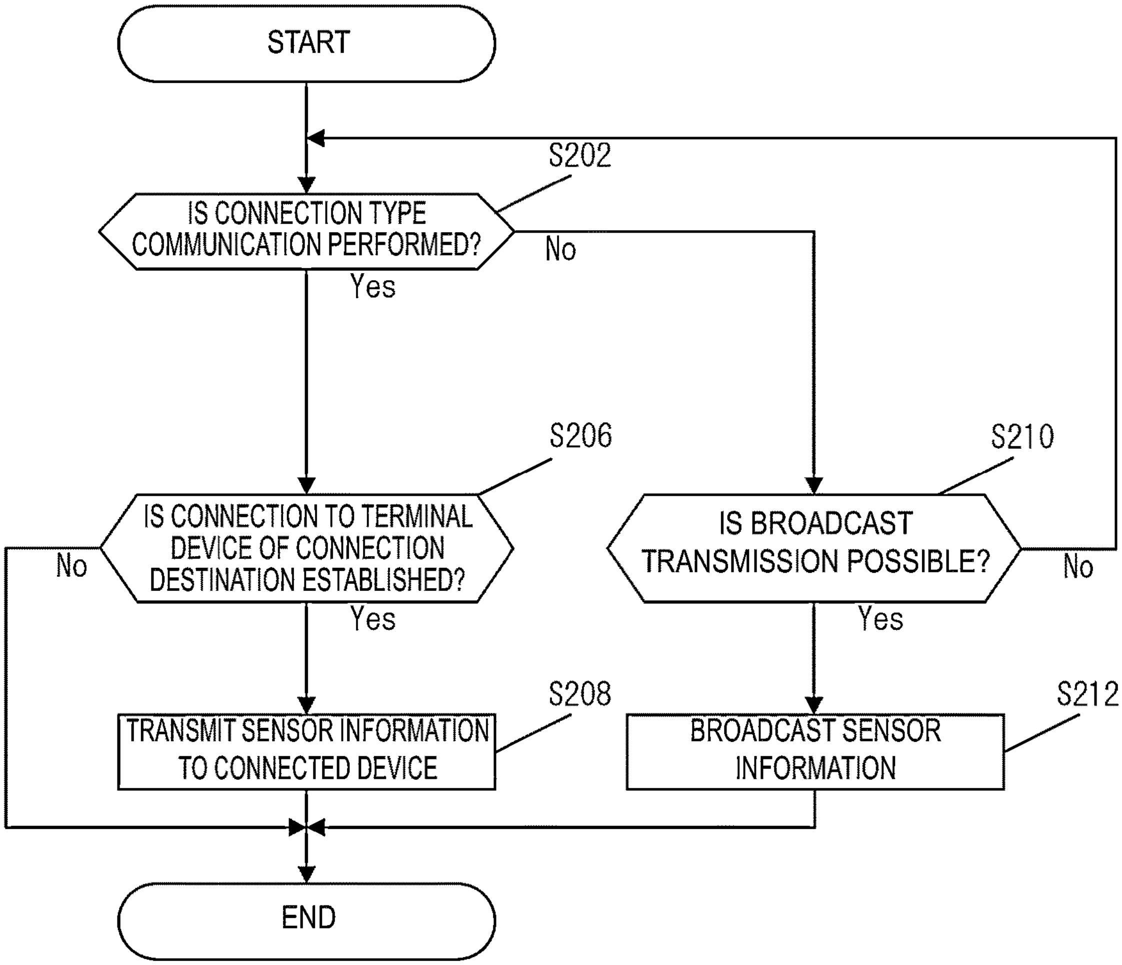

[Fig. 16]
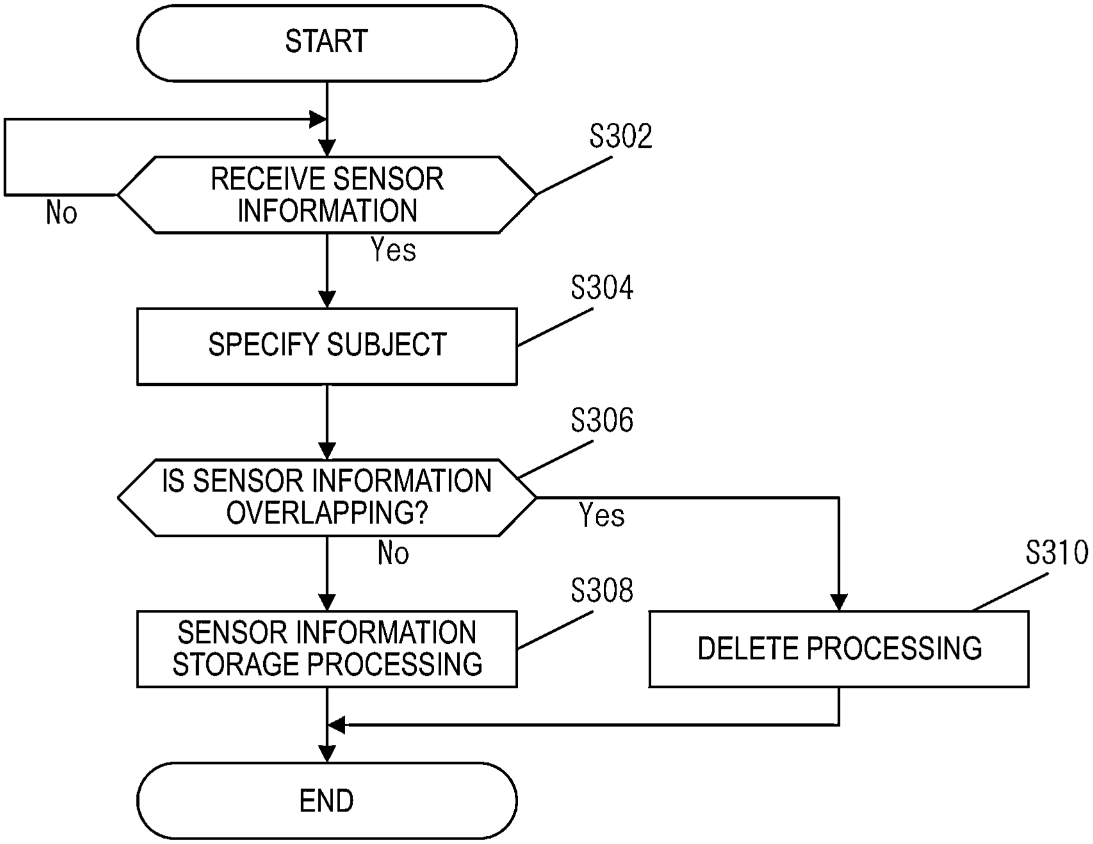

[Fig. 17]
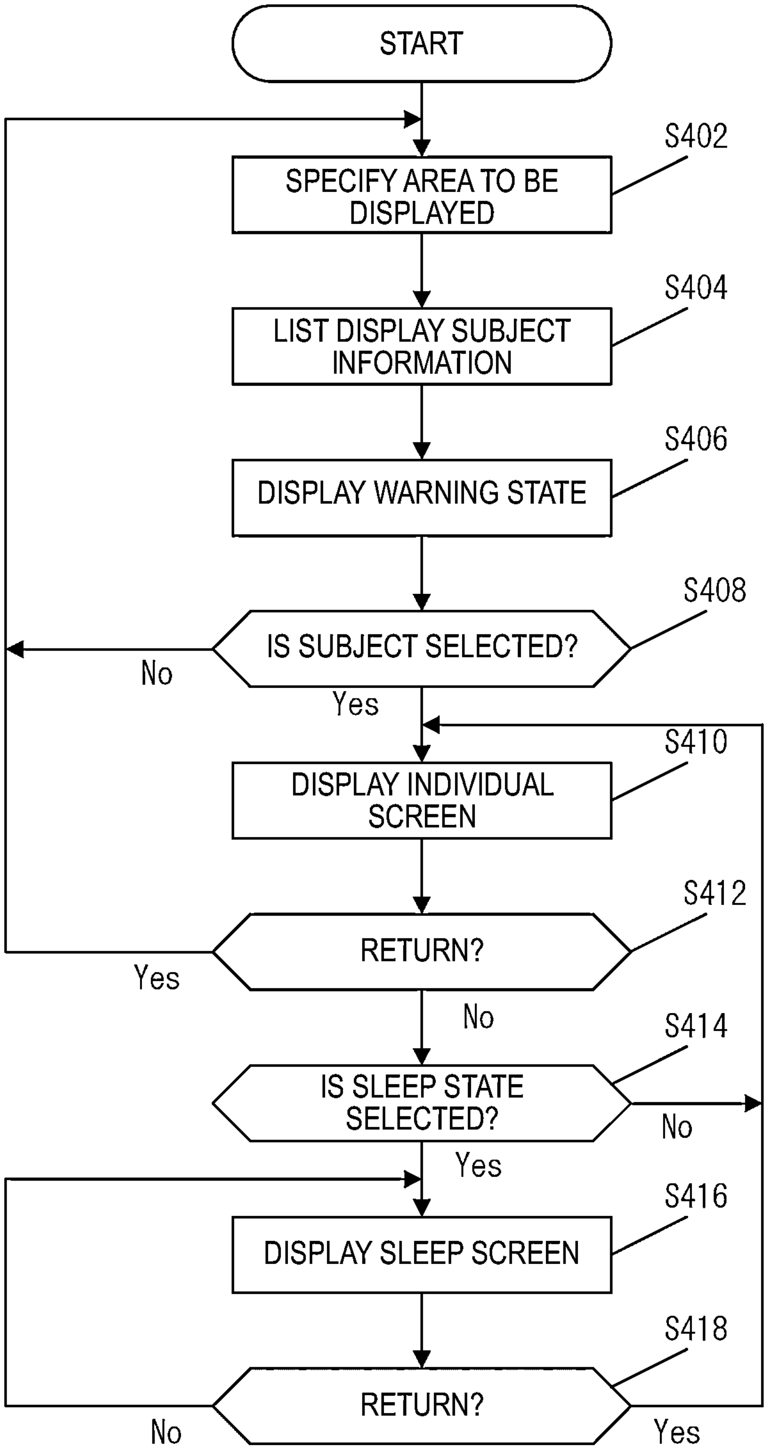

[Fig. 18]
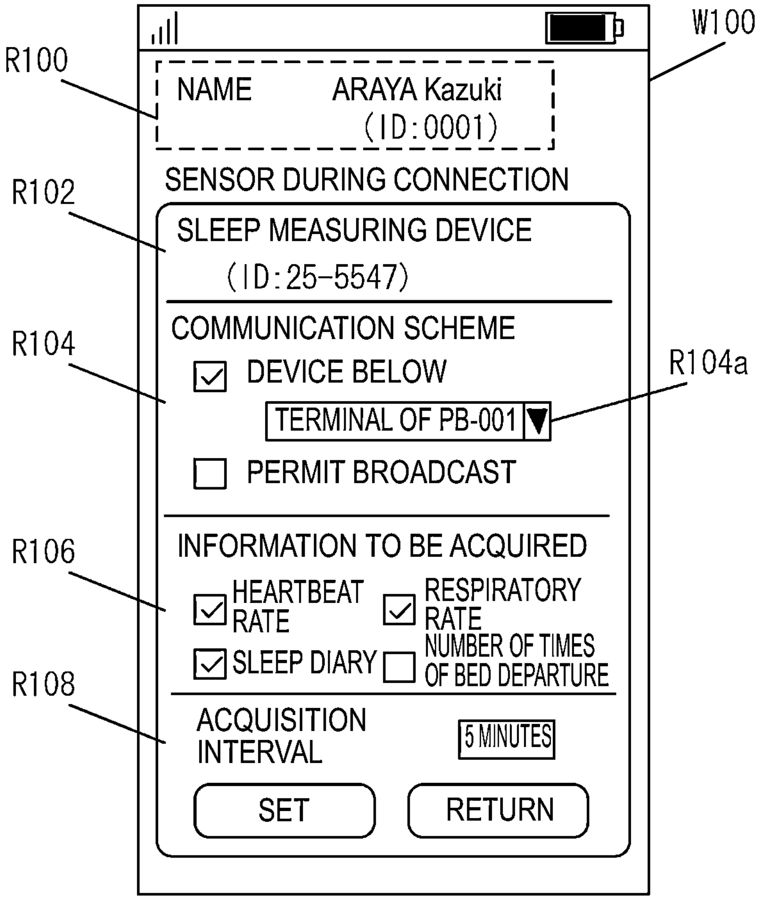

[Fig. 19]
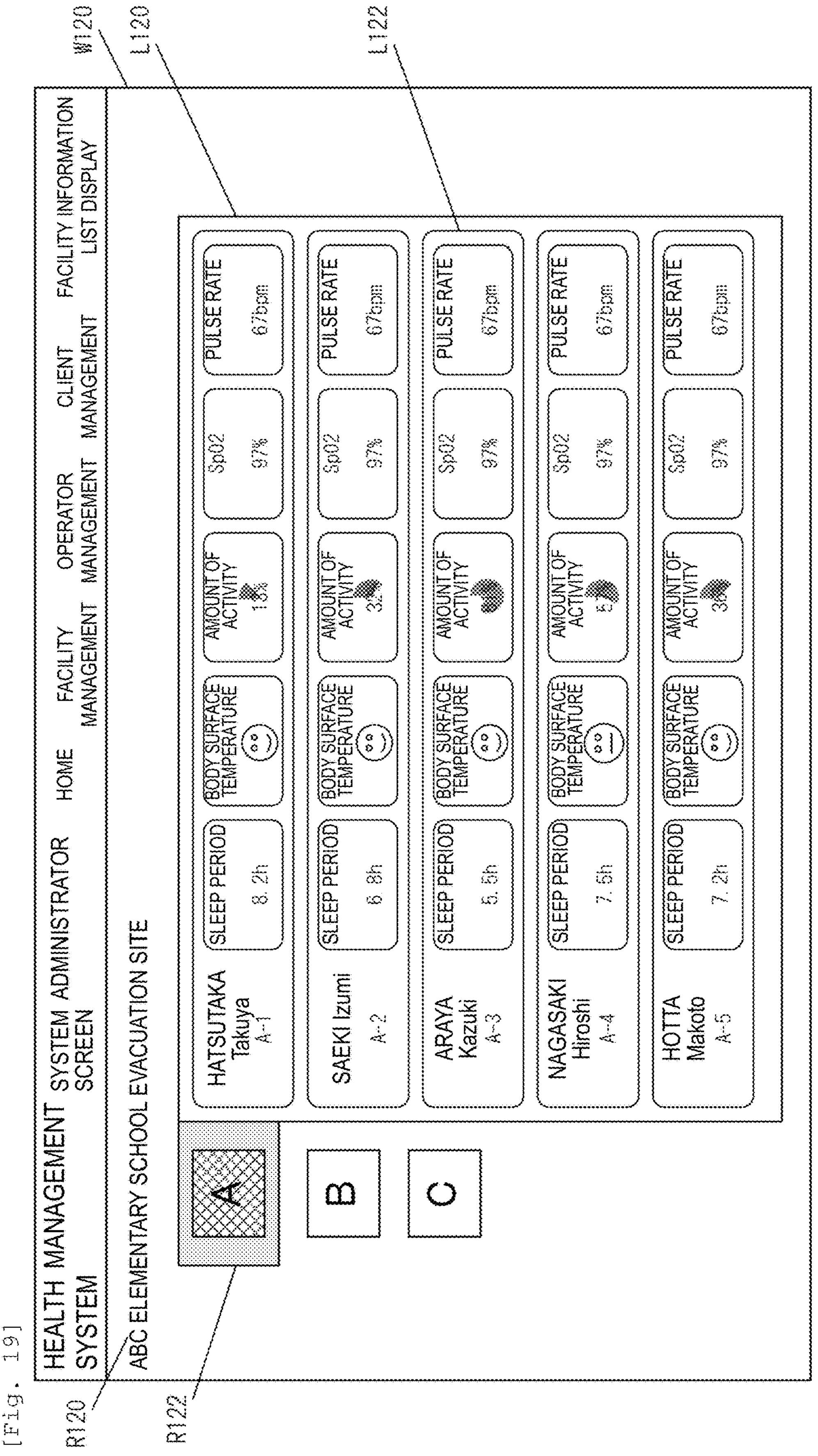

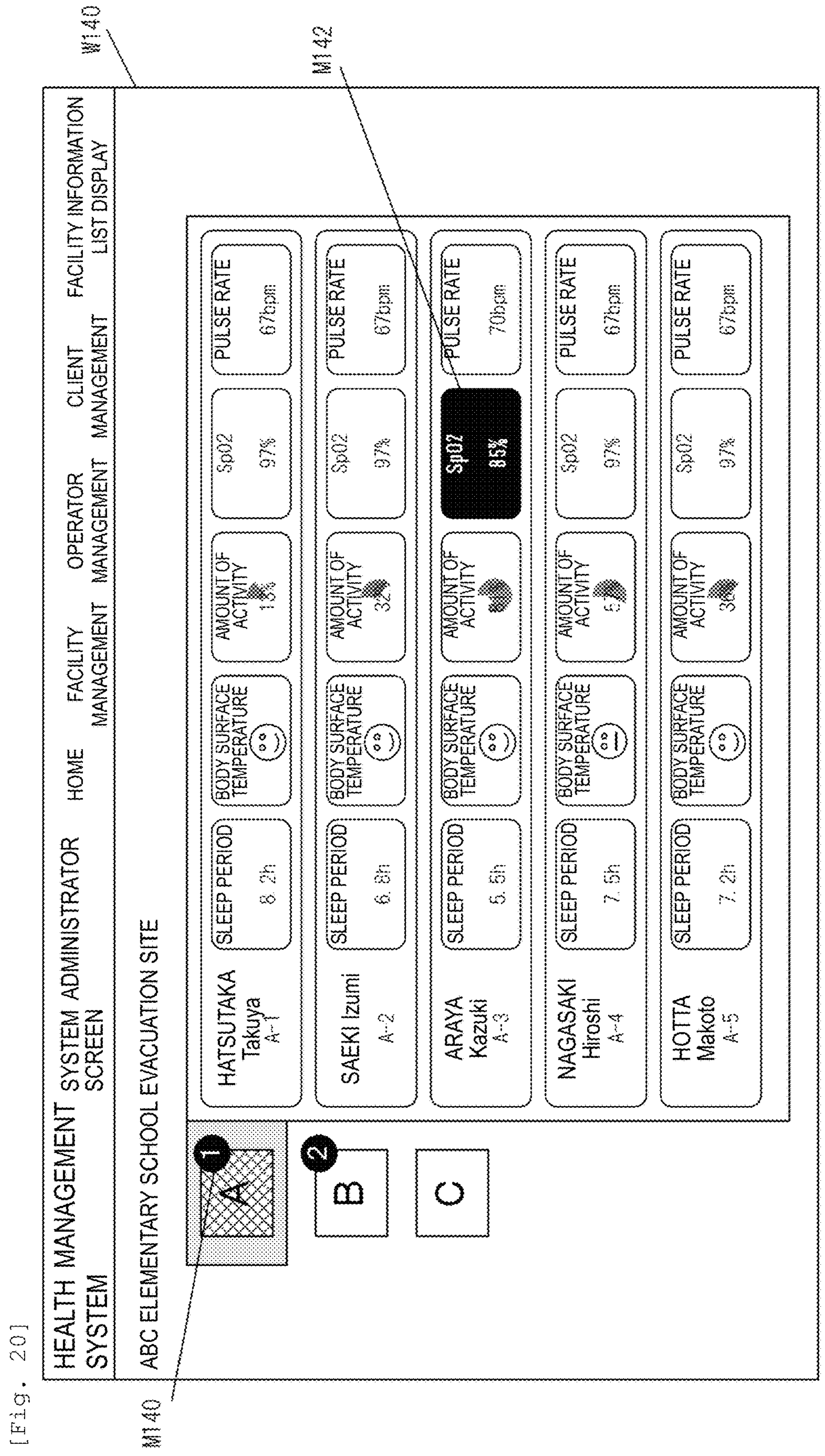
[Fig. 20]
W140
M142
M140
HEALTH MANAGEMENT SYSTEM
SYSTEM ADMINISTRATOR SCREEN
HOME
FACILITY MANAGEMENT
OPERATOR MANAGEMENT
CLIENT MANAGEMENT
FACILITY INFORMATION LIST DISPLAY
ABC ELEMENTARY SCHOOL EVACUATION SITE
A
B
C
1
2
HATSUTAKA Takuya A-1
SLEEP PERIOD 8.2h
BODY SURFACE TEMPERATURE
AMOUNT OF ACTIVITY
PULSE RATE 67bpm
SpO2 97%
SAEKI Izumi A-2
SLEEP PERIOD 6.8h
BODY SURFACE TEMPERATURE
AMOUNT OF ACTIVITY
SpO2 97%
PULSE RATE 67bpm
ARAYA Kazuki A-3
SLEEP PERIOD 5.5h
BODY SURFACE TEMPERATURE
AMOUNT OF ACTIVITY
SpO2 85%
PULSE RATE 70bpm
NAGASAKI Hiroshi A-4
SLEEP PERIOD 7.5h
BODY SURFACE TEMPERATURE
AMOUNT OF ACTIVITY
SpO2 97%
PULSE RATE 67bpm
HOTTA Makoto A-5
SLEEP PERIOD 7.2h
BODY SURFACE TEMPERATURE
AMOUNT OF ACTIVITY
SpO2 97%
PULSE RATE 67bpm

[Fig. 21]
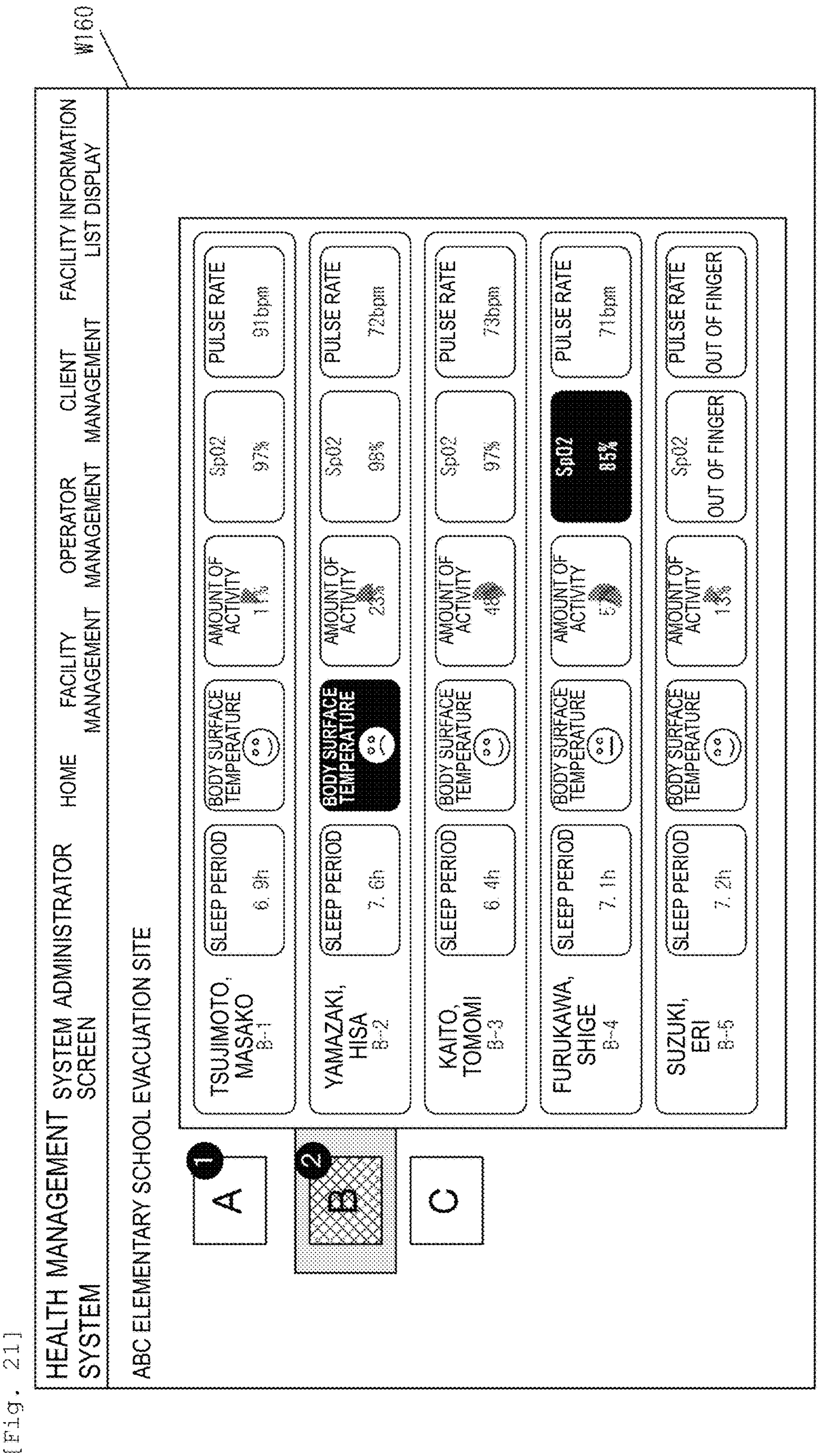

[Fig. 22]
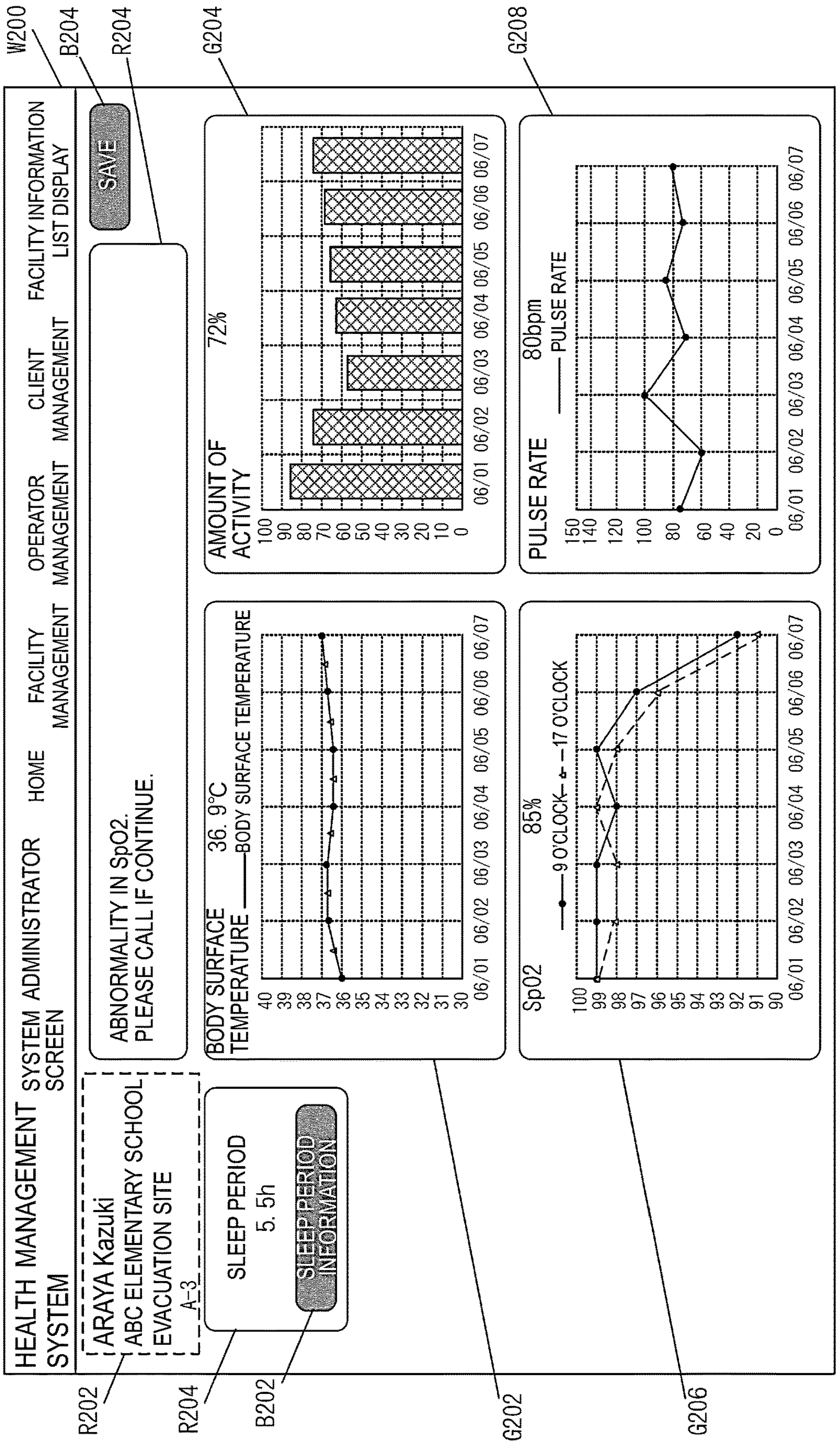

[Fig. 23]
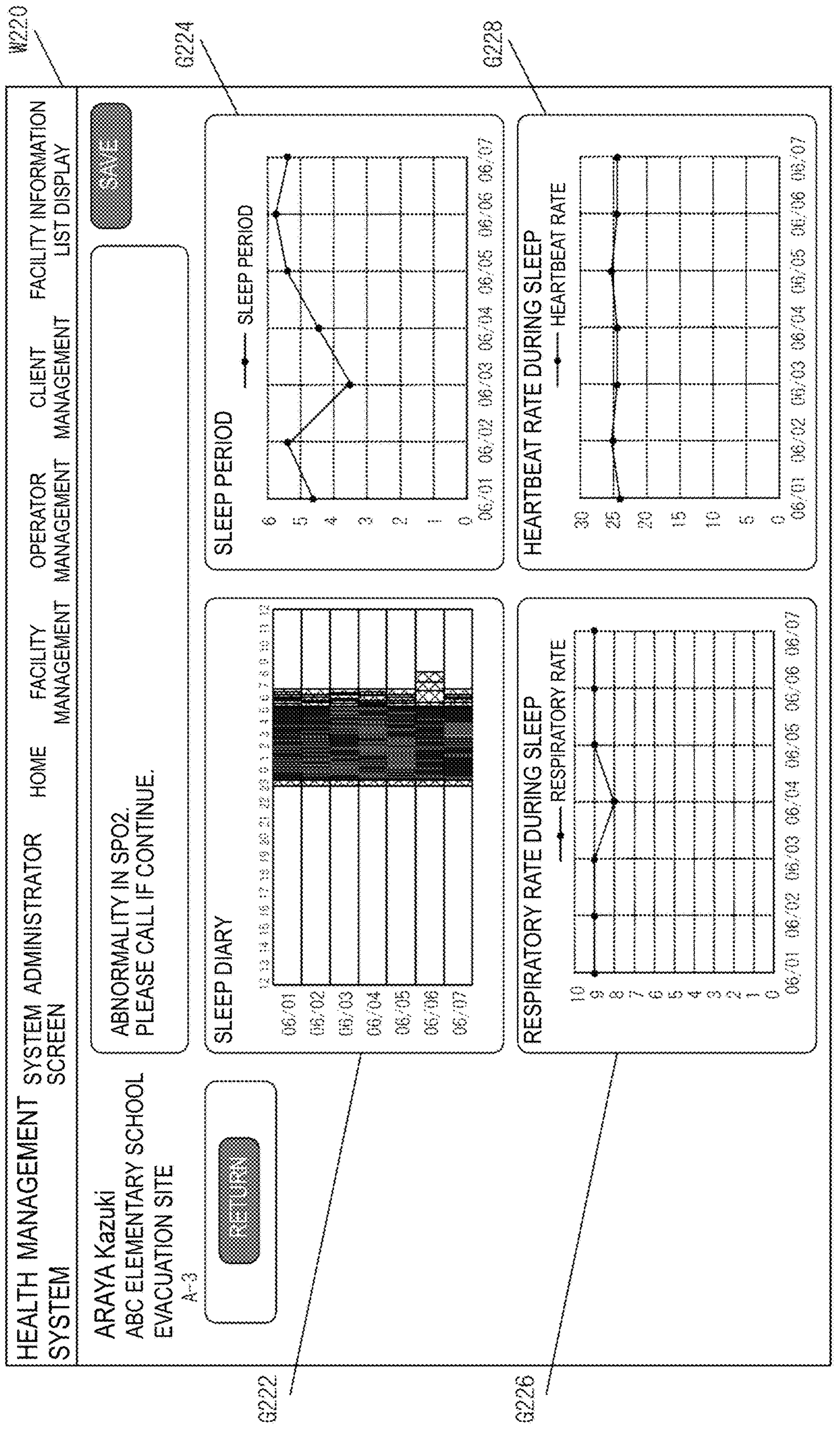

[Fig. 24]
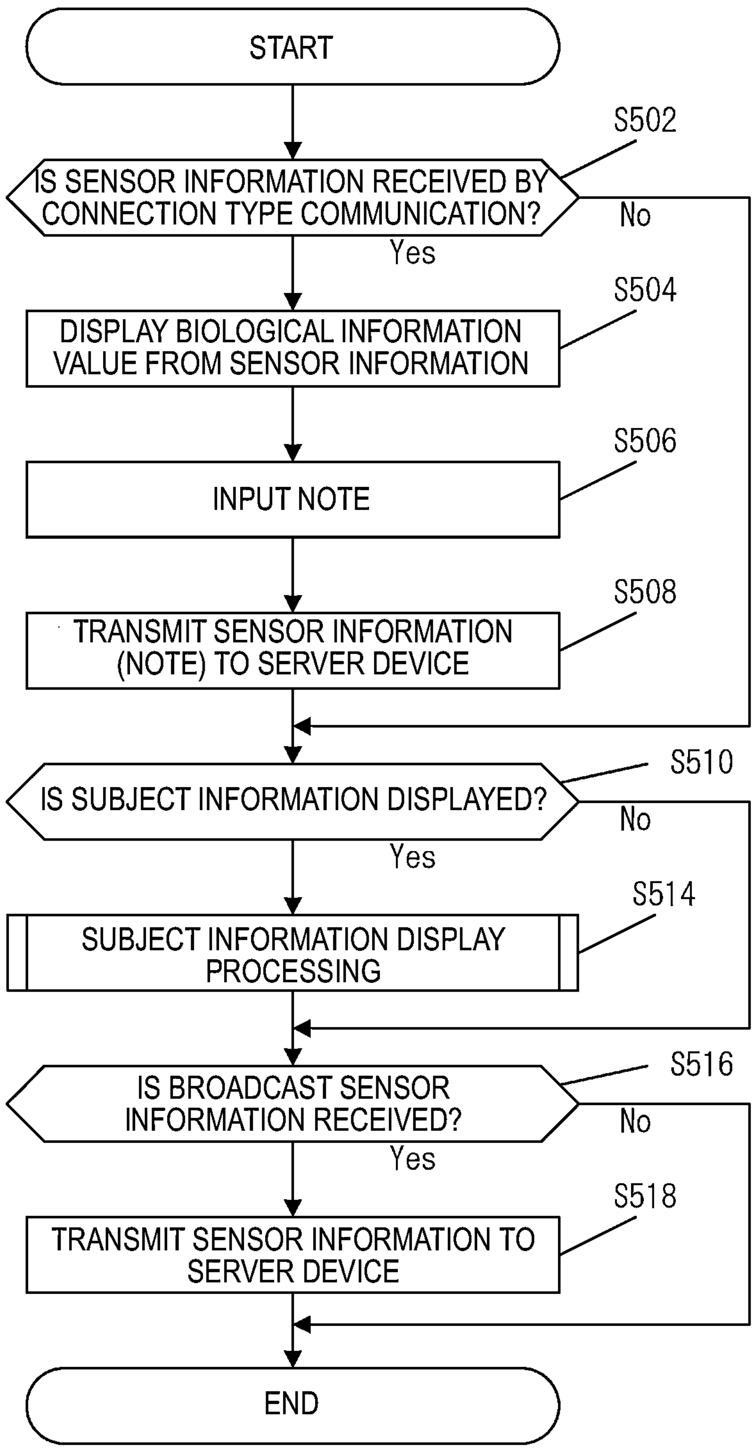

[Fig. 25]
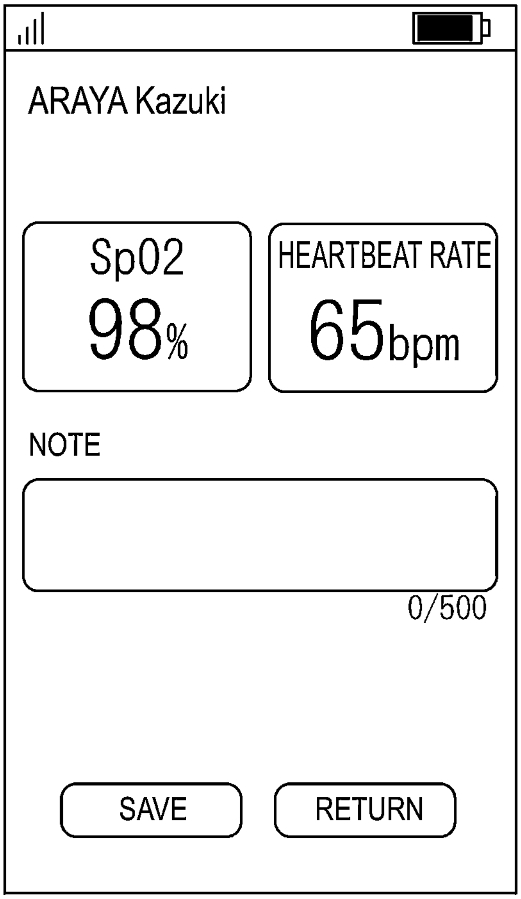

[Fig. 26]
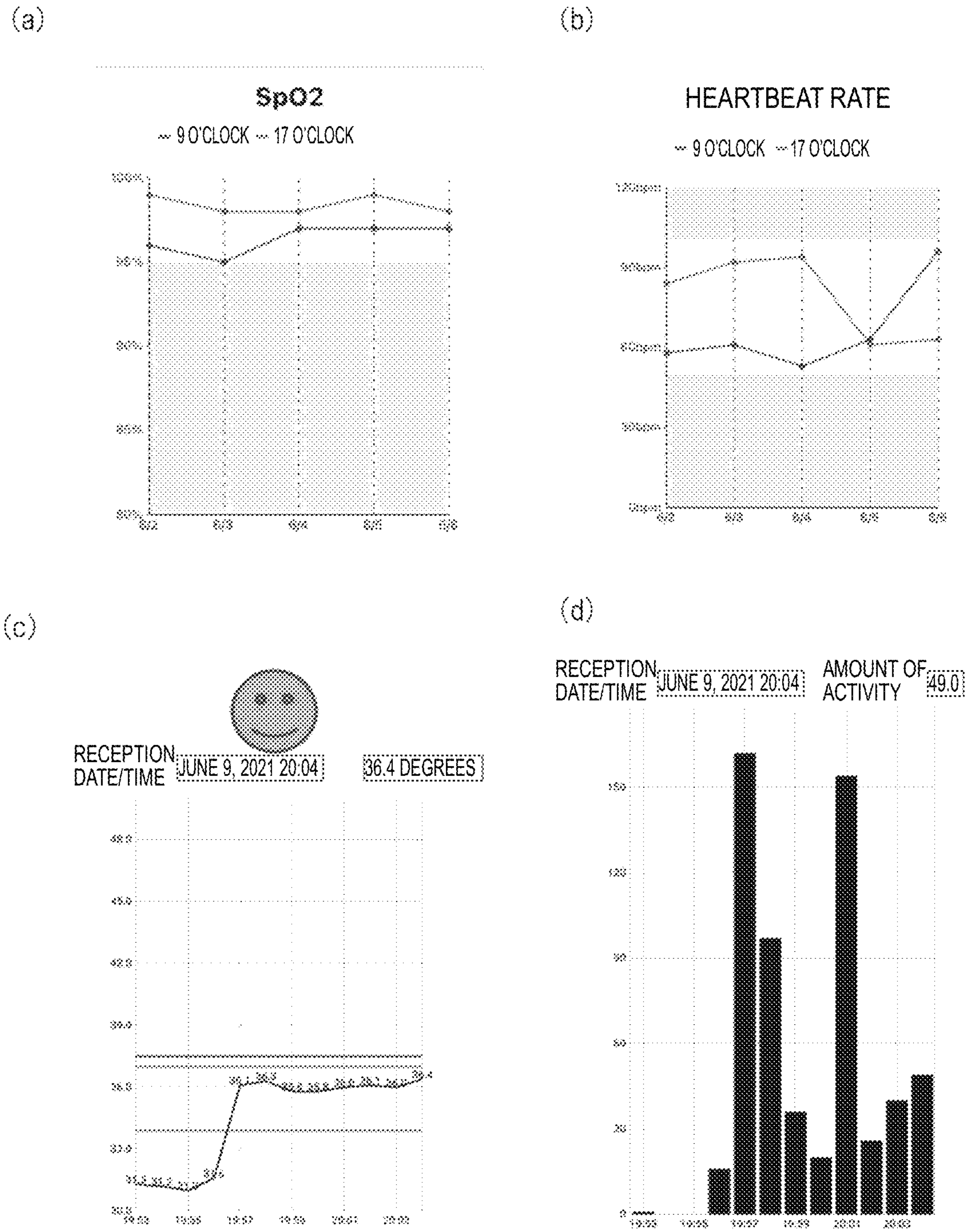

[Fig. 27]
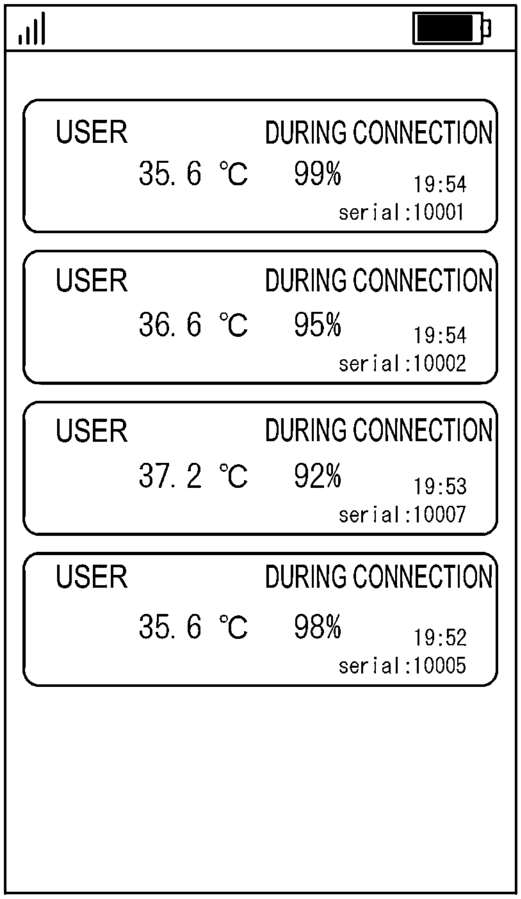

[Fig. 28]
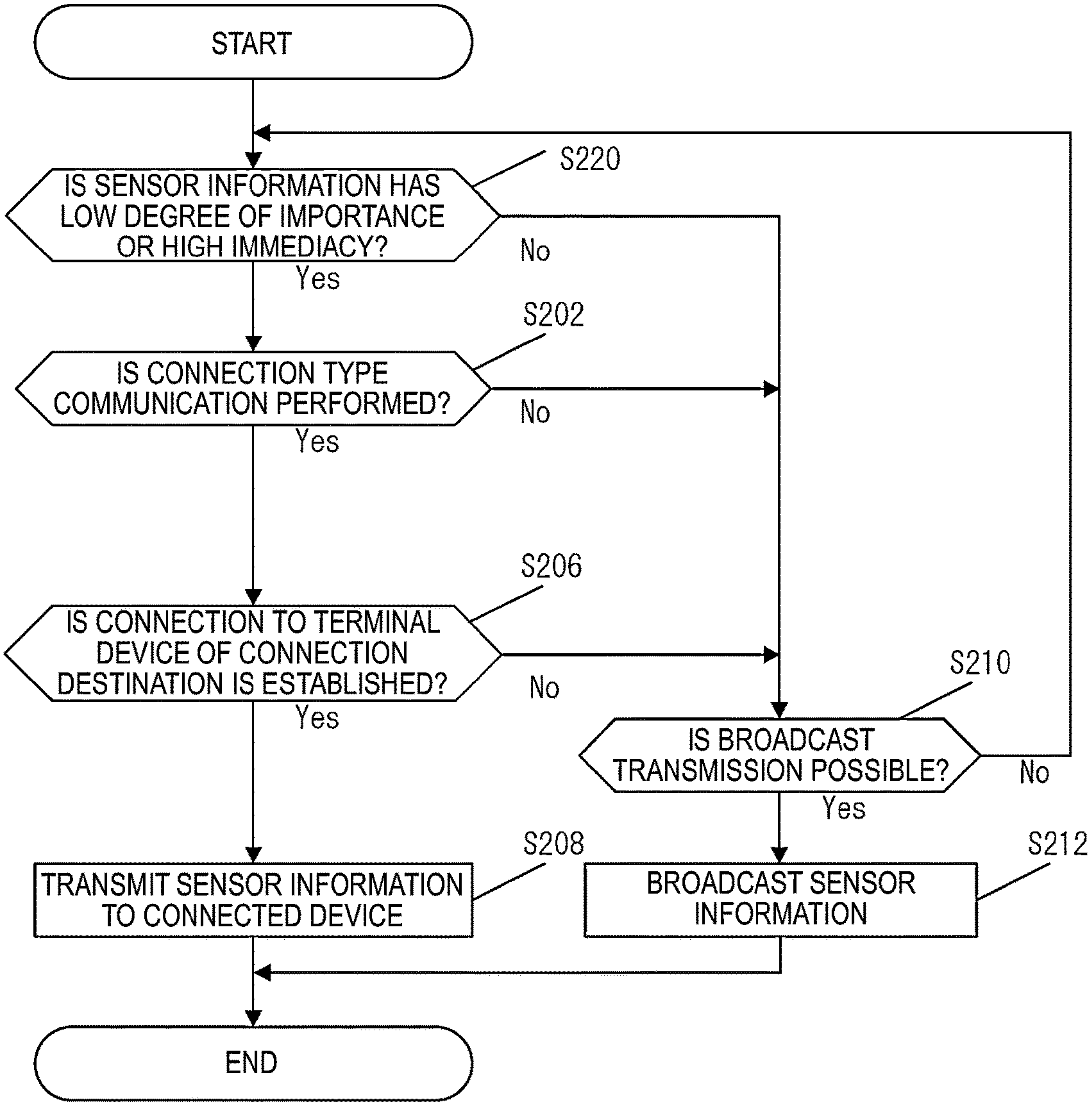

[Fig. 29]
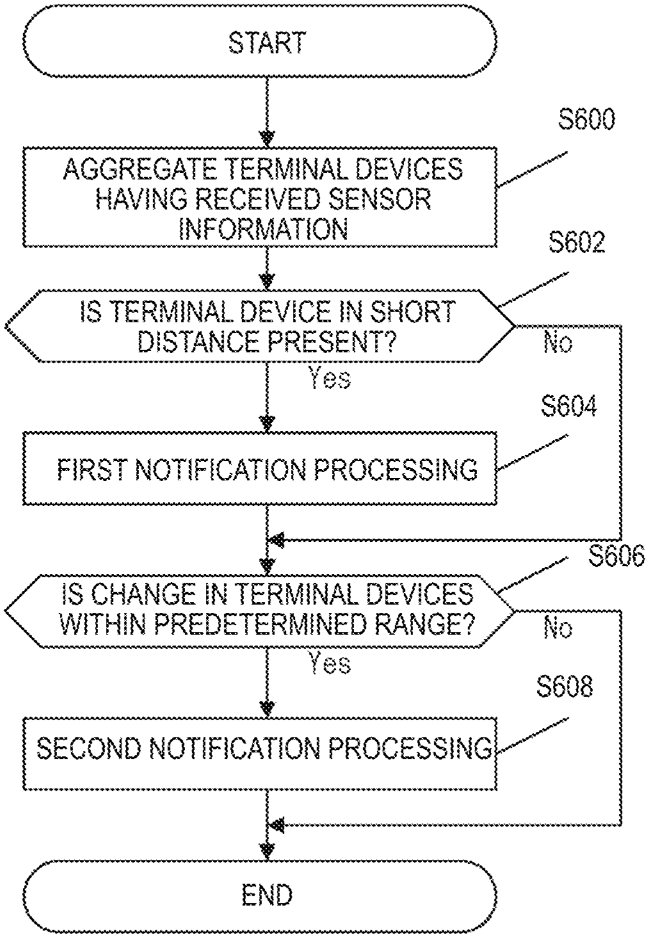

SENSOR DEVICE, SYSTEM, AND TRANSMISSION METHOD

TECHNICAL FIELD

The present disclosure relates to a sensor device and the like.

This application claims priority from Japanese Patent Application No. 2021-101709, filed on Jun. 18, 2021, the contents of which are incorporated herein by reference. The entire contents described in the abovementioned patent application are incorporated herein by reference.

BACKGROUND ART

Conventionally, a system that manages an individual physical condition by using a sensor has been known (for example, PTL 1). Moreover, a system that manages physical conditions of a plurality of workers is disclosed (for example, see PTL 2).

CITATION LIST

Patent Literature

PTL 1: JP2010-232963A
PTL 2: JP2015-154920A

SUMMARY OF INVENTION

Technical Problem

One of objects of the present disclosure is to provide a system capable of appropriately acquiring a state of a subject, and a sensor device that is used in the system.

Solution to Problem

A sensor device in the present disclosure is a sensor device that may include: an acquisition unit that acquires biological information on a subject; a communication unit that performs near field communication; and a controller, in which the controller determines whether the acquired biological information is specific biological information, transmits the biological information to a server device via the communication unit by way of a specific terminal device in a case where the biological information is the specific biological information, and transmits the biological information via the communication unit by broadcast in a case where the biological information is other than the specific biological information to transmit the biological information to the server device by way of an unspecified terminal device.

A system in the present disclosure is a system that may include: a sensor device that transmits acquired sensor information; and a terminal device that transmits the sensor information received from the sensor device to a server device, in which when the sensor information is transmitted by a connection type, a first terminal device having established communication with the sensor device transmits the sensor information to the server device, and when the sensor information is transmitted by a broadcast type, a second terminal device having received the sensor information transmits the sensor information to the server device.

A transmission method in the present disclosure is a transmission method that transmits sensor information from a sensor device by way of a terminal device to a server device, and may include: transmitting, when the sensor information has been transmitted by a connection type from the sensor device, the sensor information to the server device by the terminal device having established communication with the sensor device; and transmitting, when the sensor information has been transmitted by a broadcast type, the sensor information to the server device by any of the terminal devices having received the sensor information.

Advantageous Effects of Invention

With the system in the present disclosure, a system capable of appropriately acquiring a state of a subject and a sensor device that is used in the system are attained.

BRIEF DESCRIPTION OF DRAWINGS

FIG. 1 is a diagram illustrating an outline of a system in a first embodiment.

FIG. 2 is a diagram illustrating the outline of the system in the first embodiment.

FIG. 3 is a diagram illustrating a functional configuration of a first terminal device in the first embodiment.

FIG. 4(*a*) is a diagram illustrating one example of sensor information in the first embodiment, and (*b*) is a diagram illustrating one example of setting information in the first embodiment.

FIG. 5 is a diagram illustrating a configuration of a gateway device in the first embodiment.

FIG. 6 is a diagram illustrating a functional configuration of a second terminal device in the first embodiment.

FIG. 7 is a diagram illustrating a functional configuration of a third terminal device in the first embodiment.

FIG. 8 is a diagram illustrating a functional configuration of a sensor device in the first embodiment.

FIG. 9 is a diagram illustrating one example of setting information of the sensor device in the first embodiment.

FIG. 10 is a diagram illustrating a functional configuration of a server device in the first embodiment.

FIG. 11 is a diagram illustrating one example of a configuration of a subject DB of the server device in the first embodiment.

FIG. 12 is a diagram illustrating one example of a configuration of a sensor DB of the server device in the first embodiment.

FIG. 13 is a sequence diagram illustrating a flow of the system in the first embodiment.

FIG. 14 is a flowchart illustrating setting processing of the sensor device in the first embodiment.

FIG. 15 is a flowchart illustrating an operation of the sensor device in the first embodiment.

FIG. 16 is a flowchart illustrating an operation of the server device in the first embodiment.

FIG. 17 is a flowchart illustrating an operation of the third terminal device in the first embodiment.

FIG. 18 is a diagram illustrating an operation example in the first terminal device in the first embodiment.

FIG. 19 is a diagram illustrating an operation example in the third terminal device in the first embodiment.

FIG. 20 is a diagram illustrating the operation example in the third terminal device in the first embodiment.

FIG. 21 is a diagram illustrating the operation example in the third terminal device in the first embodiment.

FIG. 22 is a diagram illustrating the operation example in the third terminal device in the first embodiment.

FIG. 23 is a diagram illustrating the operation example in the third terminal device in the first embodiment.

FIG. 24 is a flowchart illustrating an operation of the first terminal device in the second embodiment.

FIG. 25 is a diagram illustrating an operation example in the first terminal device in the second embodiment.

FIG. 26 is a diagram illustrating the operation example in the first terminal device in the second embodiment. (a) illustrates a transition graph of SpO2, (b) illustrates a transition graph of the heartbeat rate, (c) illustrates a transition graph of the body temperature, and (d) illustrates a transition graph of the amount of activity.

FIG. 27 is a diagram illustrating the operation example in the first terminal device in the second embodiment.

FIG. 28 is a flowchart illustrating an operation of the sensor device in a third embodiment.

FIG. 29 is a flowchart illustrating an operation of the server device in a fourth embodiment.

DESCRIPTION OF EMBODIMENTS

A description will hereinafter be made on one embodiment for implementing the present disclosure with reference to the drawings. The following embodiments are examples for describing the present disclosure, and the technical scope of the invention described in the claims is not limited to the following description.

Generally, there is a sensor device capable of acquiring information related to a subject. The sensor device is capable of acquiring, for example, biological information, sleep information, state information including a motion by the subject, and a life pattern of the subject. For example, the sensor device is capable of acquiring, as the biological information, the heartbeat (heartbeat rate), the respiration (respiratory rate), the body temperature, SpO2, and the like of the subject.

Moreover, there is a system that converges information (hereinafter, subject information) on subjects acquired by a sensor device into a server device, and manages physical conditions and health of the subjects. The sensor device herein has a function of near field communication that performs communication with a terminal device, but has neither a function of performing direct communication with a server device nor a gateway function of transferring the communication of another device, in many cases. Accordingly, the sensor device transmits the acquired information by way of the terminal device having a communication function or the gateway device to the server device, in some cases.

Moreover, as disclosed in the abovementioned cited document, one or a plurality of systems that manage physical conditions have been used in a place such as a construction site and a factory. In this case, the system has needed to prepare the same number of sensor devices that acquire information on subjects and the same number of devices that perform communication between the sensor devices and a server device, as the number of the subjects.

In recent years, in an evacuation site and the like when a disaster occurs, physical condition management of evacuees causes a problem in many cases. In such a site, there has been a problem in that preparing the same number of devices that perform data transmission from the sensor devices to the server device and communication with the server device, as the number of persons, has been extremely difficult.

Moreover, as for the sensor device, a method of transmitting information on a subject by using the communication of the broadcast type in BLE can be considered. However, when the communication of the broadcast type is simply used relative to the sensor device, information on all the subjects is transmitted to the server device by way of a large number of unspecified terminal devices. This allows a third party to brows the information on the subject, which causes a problem of the lack of consideration to personal information.

In the shelter, the health management of the evacuees is extremely important. However, it was extremely difficult to go round and measure the subjects with a few health care workers in the disaster. A mechanism of grasping in real time a physical condition change in a subject during when the subject is present in the shelter, and capable of immediately corresponding to the physical condition change when occurs by the health care worker and the like is desired. Specially, under the coronavirus pandemic, it is required to allow screening with a lower contact frequency between an evacuee and a health care worker, or the remote correspondence. A system architecture that allows this operation without introducing a new device is desired.

A system and the like that solve such a problem will be described below on the basis of detailed embodiments. Note that, the following embodiments are examples of the present disclosure, and the invention is not limited to the contents.

1. First Embodiment

1.1 Overall Outline

Hereinafter, an overall outline of the present embodiment will be described. Note that, in the embodiment, a subject indicates a person whose physical condition and health state are to be managed by using the system.

Moreover, a staff indicates a person who works in a hospital, a shelter, or an elderly person facility. For example, the staff includes a health care worker such as a medical doctor and a nurse, and a person equivalent to a health care worker or a care staff who supports subjects in the elderly person facility or the like.

Moreover, subject information indicates information related to a subject who uses the system. The subject information includes not only information that can be acquired by a sensor device, but also information that is obtained on the basis of the information acquired by the sensor device. The subject information is information, such as a numerical value, a state, or the like, that changes, and information to which a staff should specially pay attention. For example, the subject information includes information as follows.

(1) Biological Information

Biological information is information related to vital signs of a subject. For example, the biological information includes information such as heartbeats (rate), respiration (rate), SpO2, a blood pressure, and a blood glucose level of the subject. Moreover, the biological information in the embodiment may include information such as the amount of activity and the number of steps of the subject.

(2) State of Subject (State Information)

A state of a subject is a state of a subject that can be determined from the acceleration, a change in the center of gravity, and the like of a sensor device. Further, state information is information indicating a state of a subject. The state information may include, for example, information such as a posture (a standing position, a lying position, a sitting position, an edge sitting position, and the like) and a sleeping posture (for example, a side-lying position and a supine position) of the subject, and a motion (during walking and during stopping) of the subject. Moreover, the state information may include a state (sleep state) whether the subject is sleeping or awake, and a state of the depth of sleep such as REM sleep or non REM sleep. Moreover, a state of a subject may include a stress state.

(3) Life Pattern (Life Pattern Information) of Subject

Life pattern information is information that is obtained from a motion of a subject. The life pattern information may include, for example, information such as bedtime, wake-up time, and a sleep period of the subject. Moreover, the life pattern information may include information such as the number of times of bed departure and the number of times of going to toilet.

(4) Environment Information

Environment information is information related to an environment where a subject is present. The environment information is, for example, the temperature, the humidity, and the loudness of sound in a room where the subject is present, and the brightness in the room, and the like. Moreover, the environment information may include, on the basis of the loudness and the pattern of sound, for example, information related to sound that is generated by the subject, such as the presence or absence and the time of snore, bruxism, or the like of the subject.

(5) Sleep Information

Sleep information is information related to sleep of a subject. The sleep information may include, for example, in the information described above, the sleep period, the bedtime, the wake-up time, the sleeping posture, and the sleep state (state indicating sleep or awake). Moreover, the sleep information may include, in the biological information, the heartbeat and the respiration when the subject is sleeping. Moreover, the sleep information may include information related to snore, bruxism, and the like of the subject.

[1.1.1 Configuration of System]

FIG. 1 is a diagram illustrating an overall outline of a system 1 in the embodiment. In the system 1, a server device 80 can receive sensor information including biological information such as heartbeat, respiration, and SpO2 of a subject P acquired by a sensor device 50.

In the system 1, a first terminal device 10, a second terminal device 20, a third terminal device 30, and the server device 80 are connected to a network NW. In the first terminal device 10, the second terminal device 20, and the third terminal device 30, applications necessary for the respective terminal devices are installed and executed, whereby the functions of the respective devices can be implemented. Accordingly, each terminal device may be the identical hardware.

One or a plurality of each of the first terminal devices 10, the second terminal devices 20, and the third terminal devices 30 may be provided. Moreover, each device in which the respective applications are installed may function as a plurality of devices. For example, one terminal device may have functions of the first terminal device 10 and the second terminal device 20.

The first terminal device 10 is a device that performs connection type communication in BLE with the sensor device 50. The first terminal device 10 includes, for example, a smartphone 12 that is owned by the subject P and a gateway device 15 that allows BLE/Wi-Fi communication. In this case, the first terminal device 10 serves as a central device, and the sensor device 50 serves as a peripheral device. Moreover, the first terminal device 10 may perform pairing with the sensor device 50 in advance.

The second terminal device 20 is a terminal device capable of performing broadcast type communication in BLE with the sensor device 50. The second terminal device 20 is, for example, a smartphone 22 that is owned by a third party. In this case, the second terminal device 20 serves as a device of an observer, and the sensor device 50 serves as a device of a broadcaster. Moreover, the first terminal device 10 may perform the broadcast type communication in addition. The second terminal device 20 is an unspecified terminal device that is owned by a person other than the subject.

The third terminal device 30 is a display device capable of displaying various information. For example, the third terminal device 30 is a display device 32 that is equipped in a hospital or the like and used for displaying information by a medical staff such as a medical doctor, a tablet 34 that is owned by a staff in an evacuation site, or the like. Moreover, the display device 32 may be mounted in a different place (for example, a hospital in a place distant from the shelter) via the network.

Note that, generally, the configuration is such that the first terminal device 10 is an own terminal device (a smartphone that is possessed by the subject), and the second terminal device 20 is another terminal device (a smartphone that is possessed by a third party other than the subject). Moreover, the third terminal device 30 is a display device or a management device that is used by a staff or the like. Moreover, hereinafter, the abovementioned respective terminal devices are comprehensively and simply referred to as "terminal devices", which specially indicate terminal devices (the first terminal device 10 and the second terminal device 20) capable of receiving data from the sensor device 50.

The sensor device 50 is a device capable of acquiring information related to the subject P (subject information). The system 1 includes the single sensor device 50 or the plural sensor devices 50. For example, like a sensor device 52, the subject P wears or directly sticks the sensor device 50 thereon, so that the sensor device 50 can acquire subject information (for example, biological information) on the subject P.

Moreover, like a sensor device 54, the sensor device 50 may be a sensor device or a measuring device provided alone. The sensor device 54 may be a device such as a clinical thermometer, a sphygmomanometer, a pulse oximeter, and a blood glucose meter, or a device that measures a motion of the subject, such as a pedometer, an activity meter, and a sleep measuring device. Moreover, the sensor device 50 may be a device that is owned by the subject in advance (for example, a smart watch or the like), or a device prepared by the system.

As the sensor device 54, any of conventional sensor devices may be used. As a method of acquiring biological information such as a respiratory rate and a heartbeat rate by the sensor device 54, for example, a method described in JP2016-30177A (Title Of Invention: RESPIRATORY DISTURBANCE DETERMINATION DEVICE, RESPIRATORY DISTURBANCE DETERMINATION METHOD, AND PROGRAM, filing date: Jul. 30, 2014) can be incorporated. Moreover, as a method of determining a sleep state, for example, methods described in JP2010-264193A (Title Of Invention: SLEEPING CONDITION DECISION INSTRUMENT, PROGRAM, AND SLEEPING CONDITION DECISION SYSTEM, filling date: May 18, 2009) and JP2016-87355A (Title Of Invention: SLEEP STATE DETERMINATION DEVICE, AND SLEEP STATE DETERMINATION METHOD AND PROGRAM, filling date: Nov. 11, 2014) can be incorporated. Moreover, publicly known techniques other than the abovementioned methods may be used as a method of acquiring biological information by the sensor device 54.

The server device 80 is a device that stores information on a subject and registers the information on the subject in a system of electronic medical records. The server device 80 receives information acquired by the sensor device 50 by way of the first terminal device 10 or the second terminal device 20. The server device 80 stores the received information for every subject.

Moreover, the server device 80 may output an alert from the subject information. For example, in a case where a biological information value of a subject is within a range of warning, the server device 80 may make a notification to a staff and the like, or make a notification to a terminal device.

[1.1.2 Outline of Communication]

An outline of the communication in the embodiment will be described with reference to FIG. 2. The sensor device 50 is connectable to the first terminal device 10 and the second terminal device 20 by the wireless communication. In the embodiment, an example in which the sensor device 50 performs communication by near field communication will be described, and as one example, a case where the sensor device 50 performs wireless communication by using Bluetooth (registered trademark) or Bluetooth Low Energy (hereinafter, BLE) will be described.

Generally, communication schemes of BLE include broadcast type communication that performs the communication without specifying a communication counterpart, and connection type communication that performs the communication after specifying a communication counterpart. The sensor device 50 performs the connection type communication with the first terminal device 10, and performs the broadcast type communication with the second terminal device 20.

In other words, in a case where the connection type communication is performed, the sensor device 50 serves as a peripheral device, and the first terminal device 10 serves as a central device. The sensor device 50 periodically transmits advertising data (advertising packet) indicating the connection type communication, and the first terminal device 10 receives the advertising data. The first terminal device 10 having received advertising data makes a connection request to the sensor device 50 in a case where the advertising data indicates the connection type communication, so that connection between the sensor device 50 and the first terminal device 10 is established.

Herein, establishing the connection is a state where data can be transmitted and received bidirectionally between the two devices. In this case, data can be transmitted and received between the sensor device 50 and the first terminal device 10. For example, establishing the connection is a state where a communication path through which data is transmitted and received between the two devices is established.

Moreover, for example, if a PDU field in an advertising packet is data indicating that the connectivity is "present", the first terminal device 10 determines that the advertising packet indicates the communication of the connection type.

Accordingly, the sensor device 50 transmits sensor information to the server device 80 by way of RT1, as a route by way of the first terminal device 10 to the server device 80 but not by way of an unintended terminal device. For example, the sensor device 54 establishes the connection to the gateway device 15, and transmits sensor information to the gateway device 15. Moreover, the gateway device 15 transmits the sensor information having been received from the sensor device 54 to the server device 80 by way of the network NW.

Note that, the sensor device 50 may be connectable to a plurality of devices. Moreover, the sensor device 50 may establish the connection to a plurality of devices.

Moreover, in a case where the communication of the broadcast type is performed, the sensor device 50 serves as a broadcaster, and transmits advertising data (advertising packet) indicating broadcast communication. At this time, the sensor device 50 transmits advertising data inclusive of identification information on the sensor device 50 and information (sensor information) acquired by the sensor device 50.

When the second terminal device 20 receives advertising data from the sensor device 50, the second terminal device 20 transmits the advertising data to the server device 80. Specifically, the second terminal device 20 determines that the advertising data is advertising data indicating the communication of the broadcast type. Moreover, for example, if a PDU field in an advertising packet is data indicating that the connectivity is "not present", the second terminal device 20 determines that the advertising packet indicates the communication of the broadcast type.

Accordingly, the sensor device 50 periodically transmits data (advertising data) inclusive of the sensor information. In other words, the sensor device 50 broadcasts data inclusive of the sensor information toward other devices. Further, when the second terminal device 20 receives advertising data, the second terminal device 20 transmits the data to the server device 80.

Accordingly, the sensor information transmitted from the sensor device 50 is transmitted to the server device 80 by way of a route RT2. The second terminal device 20 may be any device among terminal devices of the third party, so that sensor information can be transmitted by a communication method with high availability.

For example, the sensor device 54 periodically transmits advertising data inclusive of the sensor information. When the smartphone 22 that is owned by a third party near the sensor device 54 receives advertising data, the smartphone 22 transmits the received advertising data to the server device 80.

Note that, the second terminal device 20 may transmit advertising data without any change to the server device 80, or may extract only sensor information from the advertising data and transmit the sensor information to the server device 80. The second terminal device 20 only needs to transmit the sensor information acquired by the sensor device 50 to the server device 80 by any method.

Moreover, one or a plurality of the second terminal devices 20 are present in the system 1. Among the second terminal devices 20 that are provided in the system 1, the device that has received advertising data transmitted from the sensor device 50 by the broadcast transmits the sensor information to the server device 80. In the system 1, the sensor device 50 can transmit the sensor information to the server device 80.

The sensor device 50 performs the communication of the broadcast type to cause any second terminal device 20 to be used, and thus can reliably transmit sensor information to the server device 80. In other words, it is possible to provide the communication method with high availability.

In this manner, in the system in the embodiment, a first communication method with high reliability and a second communication method with high availability can be used as appropriate. Accordingly, the system in the embodiment can provide a system that can appropriately converge necessary sensor information into the server device, for example, even in an environment such as a shelter in which a larger number of persons are gathered. Moreover, the system in the embodiment is similarly applicable in a place other than the shelter, for example, a sport venue or an event venue.

1.2 Device Configuration

Subsequently, configurations of the respective devices in the embodiment will be described. Note that, the common configuration will be described firstly.

A controller is a device that entirely controls each device. The controller provides various functions by reading and executing various programs stored in a memory of each device, and is implemented by one or a plurality of control devices, for example. The controller may be configured as a system on a chip (SoC), for example, or may be configured as one function such as a central processing unit (CPU).

The memory is a device that stores various programs and various data necessary for an operation of each device. The memory is implemented by a device, such as a semiconductor memory and a hard disk drive (HDD), that can be mounted to each device, for example. Moreover, the memory may have different configurations between a storage device (memory) that is a temporal storage area in which a program and a memory are developed when the program is executed, and a storage device that is a non-temporal storage area in which data, a program, and the like are stored. The program in the embodiment is stored in a non-temporal physical storage medium that is readable in the computer.

A communication unit is a device that provides a function of connecting the relevant device to another device and a network. For example, the communication unit is a network interface card (NIC) that allows the communication by a communication scheme of a wireless LAN such as IEEE802.11a/b/g/or a wired LAN. Moreover, the communication unit may be a communication module that can use mobile communication such as long term evolution (LTE)/4G/5G/6G.

A near field communication unit implements near field communication. In the embodiment, although Bluetooth Low Energy (BLE) of Bluetooth (registered trademark) is used, the embodiment is applicable to a similar technique, for example, Bluetooth5. Moreover, the near field communication unit may perform communication by another scheme as long as the sensor device can use the scheme in the communication with the terminal device. For example, communication in Low Power Wide Area (LPWA) may be used, and communication in Sigfox, Wi-Fi HaLow, ZETA, and the like may be used, for example.

A user interface device is a device with which a user or the like performs an operation input into each device. For example, the user interface device may be an external input device such as a keyboard and a mouse, or may be a software key that is implemented using a touch panel.

A display is a device on which each device displays various information. For example, the display may be a display device such as an organic EL display that uses Liquid Crystal Display (LCD) and Organic Light Emitting Diode (OLED), or may be an external display device that is connected by HDMI (registered trademark) and DVI.

[1.2.1 First Terminal Device]

FIG. 3 is a diagram illustrating a configuration of the first terminal device 10. The first terminal device 10 includes a controller 100, a memory 110, a communication unit 120, a near field communication unit 130, a user interface device 150, and a display 160. Hereinafter, a specific configuration of the first terminal device 10 will be mainly described.

The controller 100 functions as a setting unit 102, a transfer controller 104, and a subject information display 106 by reading a program from the memory 110 and executing the program.

The setting unit 102 performs various setting relative to the sensor device 50. For example, the setting unit 102 sets a type of information to be transmitted to the server device 80, and sets a communication scheme, relative to the sensor device 50. The content set by the setting unit 102 is stored in a setting information storage area 114 as setting information. Moreover, the setting unit 102 transmits setting information to the sensor device 50.

The transfer controller 104 transmits (transfers) sensor information received from the sensor device 50 to the server device 80. The transfer controller 104 acquires sensor information in a case where a communication path between the sensor device 50 and the first terminal device 10 is established (in a case where pairing with the sensor device 50 has been set in advance and the connection has been performed). Further, the transfer controller 104 transmits the acquired sensor information to the server device 80.

The subject information display 106 displays subject information on a user (subject) of the first terminal device 10. For example, the subject information display 106 displays, on the basis of subject information (biological information) included in the sensor information acquired from the sensor device 50, the subject information on the display 160. The subject information display 106 displays, as the biological information included in the subject information, for example, a specific biological information value, a graph indicating the transition of the biological information value, and the like. Moreover, the subject information display 106 may display subject information stored in a subject information storage area 116, or may acquire and display subject information from the server device 80.

The memory 110 allocates storage areas of a sensor information storage area 112, the setting information storage area 114, and the subject information storage area 116.

The sensor information storage area 112 stores sensor information received from the sensor device 50. Note that, the sensor information storage area 112 may temporarily store or may constitutively store sensor information. The sensor information storage area 112 may temporarily store sensor information during a period before the sensor information is transmitted to the server device 80.

For example, FIG. 4(*a*) illustrates one example of sensor information that is stored in the sensor information storage area 112. In the sensor information, a sensor device ID (for example, "012-3456") of a sensor device, a subject ID (for example, "0001"), acquisition date/time (for example, "2021/06/01 23:10:15"), for example, a heartbeat rate (for example, "80") and a respiratory rate (for example, "10"), which serve as information actually acquired by the sensor device 50, and a note (for example, "DIFFICULTY IN FALLING ASLEEP") are stored.

An identification ID of the sensor device 50 is specific information for specifying the sensor device 50. The subject ID is an ID of a subject to be used in the first terminal device 10. The acquisition date/time may be date/time at which the sensor device 50 has acquired the information, or may be date/time at which the first terminal device 10 has acquired the sensor information.

Moreover, one or a plurality of information acquired by the sensor device 50 can be included. Information acquired by the sensor device 50 illustrated in FIG. 4(*a*) includes, as one example, the heartbeat rate and the respiratory rate in the biological information. Apart from that, the information acquired by the sensor device 50 may include SpO2, and values of the blood pressure, the body temperature, and the blood glucose level, and may include a sleep period and a state of a subject (for example, a posture and a position).

Moreover, the information acquired by the sensor device 50 may include a plurality of information of the same type, such as the heartbeat rate. For example, the sensor device 50 acquires the heartbeat rate for every one minute. Further, the sensor device may collectively transmit the acquired heartbeat rates as sensor information for every ten minutes to the first terminal device 10.

The subject may freely input the note. Moreover, voice input and an image photographed by the first terminal device 10 may be attached.

The setting information storage area 114 stores setting information that is information related to setting relative to the sensor device 50. For example, FIG. 4(*b*) illustrates one example of setting information that is stored in the setting information storage area 114. As setting information, for every sensor device 50 capable of acquiring sensor information, an identification ID (for example, "012-345") of a sensor device, a communication scheme (for example, "CONNECTION TYPE"), types of information (for example "HEARTBEAT RATE AND RESPIRATORY RATE") to be acquired by the sensor device 50, an interval (for example, "10 MINUTES") to acquire information, and a subject ID (for example, "0001") are stored.

An identification ID of a sensor device is information for identifying the sensor device 50. For example, the identification ID may be identification information unique to the sensor device 50, and may be identification information that is included in advertising data to be transmitted by the sensor device 50. Moreover, the identification ID may be a name such as a name or an ID of the sensor device 50 given by a system or a staff.

As for a communication scheme, a communication scheme of the sensor device 50 is set. As a communication scheme, "CONNECTION TYPE" and "BROADCAST TYPE" can be set. Moreover, the communication scheme can be also set as "CONNECTION TYPE/BROADCAST TYPE". In this case, the controller 100 can automatically switch between the communication of the connection type and the communication of the broadcast type, or can perform both of the communications.

As for information to be acquired, information to be acquired by the sensor device 50 is set. Among the information that the sensor device 50 can acquire (for example, biological information and the like), one or a plurality of information can be set. Moreover, information to be acquired may be set as all the information.

As for an acquisition interval, an interval at which the sensor device 50 acquires information is set. Moreover, in the embodiment, although the sensor device 50 transmits the acquired sensor information at the acquired timing, the timing at which sensor information is acquired and the timing at which the sensor information is transmitted (transmission interval) may be different. For example, the sensor device 50 may set the acquisition interval to 10 minutes and the transmission interval to 60 minutes.

As for a subject ID, identification information for specifying a subject is stored. A subject ID may be specified by matching from the identification ID of the sensor device in the server device 80. In this case, the subject ID does not need to be included in the setting information.

Note that, in addition to the subject ID, information (basic information) related to a subject may be stored. For example, basic information may include information such as a name, a body weight, a body height, a person in charge, and an evacuation site of a subject, as information related to the subject.

Note that, in a case where pairing is performed, the setting information storage area 114 may store information related to the pairing in addition. When pairing with the sensor device 50 is performed by a function of OS in the first terminal device 10, information (pairing information) necessary for the pairing is stored in the memory 110. The controller 100 may perform the function of pairing by executing the function of OS or may perform by executing anther application. In a case where the controller 100 performs pairing by executing any application in the embodiment, pairing information may be stored in the setting information storage area 114 in addition.

The subject information storage area 116 stores subject information on a subject who uses the first terminal device 10. The subject information may be stored on the basis of sensor information acquired from the sensor device 50 by the controller 100, or may be received from the server device 80 and stored.

In a case where the first terminal device 10 is the gateway device 15, FIG. 5 illustrates a functional configuration of the gateway device 15. The gateway device 15 includes a controller 100A, a memory 110A, a communication unit 120A, and a near field communication unit 130A.

The controller 100A of the gateway device 15 implements a function of a transfer controller 102A by reading and executing a program stored in the memory 110A. The transfer controller 102A implements a function equivalent to that of the transfer controller 104.

Moreover, the memory 110A allocates a storage area of a sensor information storage area 112A. In the sensor information storage area 112A, sensor information to be transferred from the sensor device 50 to the server device 80 is temporarily stored.

In other words, the first terminal device 10 can provide the same function by using the smartphone 12 or using the gateway device 15.

[1.2.2 Second Terminal Device]

FIG. 6 is a diagram illustrating a configuration of the second terminal device 20. The second terminal device 20 includes a controller 200, a memory 210, a communication unit 220, a near field communication unit 230, a user interface device 250, and a display 260. Hereinafter, a specific configuration of the second terminal device 20 will be mainly described.

The controller 200 functions as a transfer controller 202 by reading a program stored in the memory 210 and executing the program. The transfer controller 202 transfers (transmits) sensor information received from the sensor device 50 to the server device 80.

In other words, the transfer controller 202 receives advertising data (advertising packet) from the sensor device 50 via the near field communication unit 230. The second terminal device 20 only needs to receive data from the sensor device 50, and does not need to establish connection to the sensor device 50.

The transfer controller 202 transmits sensor information that is included in the advertising data to the server device 80. The transfer controller 202 may transmit the advertising data without any change to the server device 80, or may extract sensor information from the advertising data and transmit the sensor information to the server device 80.

The memory 210 allocates a storage area of a sensor information storage area 212. The sensor information storage area 212 is an area in which the sensor information received from the sensor device 50 is temporarily stored. Note that, the sensor information stored in the sensor information storage area 212 is preferably deleted after the sensor information is transmitted to the server device 80.

[1.2.3 Third Terminal Device]

FIG. 7 is a diagram illustrating a configuration of the third terminal device 30. The third terminal device 30 includes a controller 300, a memory 310, the communication unit 320, a user interface device 350, and a display 360. Hereinafter, a specific configuration of the third terminal device 30 will be mainly described.

The controller 300 functions as a subject information display controller 302 and a subject state management unit 304 by reading a program stored in the memory 310 and executing the program.

On the basis of subject information received from the server device 80 and subject information stored in a subject information storage area 312, the subject information display controller 302 displays various information on the display 360 on the basis of the subject information.

The subject state management unit 304 makes a notification to a staff on the basis of the subject information. For example, the subject state management unit 304 sets thresholds of an attention range and a warning range for every subject information. Further, the subject state management unit 304 executes attention processing or warning processing in a case where each subject information is included in an attention range or included in a warning range.

For example, the subject state management unit 304 calls an attention to the staff or the like by identification displaying list-displayed subject information. Moreover, in a case where the heartbeat rate of a given subject has fallen in the warning range, the subject state management unit 304 outputs alarm sound to call an attention to the staff or the like. The subject state management unit 304 performs management of health states and physical conditions of the entire subjects.

The memory 310 allocates a storage area of the subject information storage area 312. The subject information storage area 312 stores subject information. The subject information is received from the server device 80, and stored. Moreover, subject information may be input by the staff or the like via the user interface device 350, or biological information may be additionally stored from an external device (for example, a clinical thermometer, a sphygmomanometer, and the like) via the communication unit 320.

[1.2.4 Sensor Device]

FIG. 8 is a diagram illustrating a configuration of the sensor device 50. The sensor device 50 includes a controller 500, a memory 510, a near field communication unit 530, and an acquisition unit 540. Hereinafter, a specific configuration of the sensor device 50 will be mainly described.

The controller 500 implements a function of a sensor information transmitter 502 by executing a program stored in the memory 510.

The sensor information transmitter 502 transmits the acquired sensor information and sensor information that is stored in a sensor information storage area 512, via the near field communication unit 530. Herein, in a case where the communication mode of the sensor device 50 is set as a connection type in the setting information, the sensor information transmitter 502 establishes connection to the first terminal device 10 serving as a connection destination. Further, the sensor information transmitter 502 transmits sensor information to the server device 80 via the first terminal device 10.

On the other hand, in a case where the communication mode of the sensor device 50 is set as a broadcast type in the setting information, the sensor information transmitter 502 transmits advertising data inclusive of sensor information. In other words, the sensor information transmitter 502 transmits sensor information to the server device 80 via the terminal device (for example, the second terminal device 20) that is provided in the system 1.

The memory 510 allocates storage areas of the sensor information storage area 512 and a setting information storage area 514.

The sensor information storage area 512 is an area in which sensor information that is information acquired by the sensor device 50 is temporarily stored.

The setting information storage area 514 stores setting information that is information related to setting of the sensor device 50.

FIG. 9 is a diagram illustrating one example of setting information that is stored in the setting information storage area 514. The setting information stores a transmission destination ID (for example, "325-44587") for identifying a transmission destination device to which sensor information is transmitted, a communication scheme (for example, "CONNECTION TYPE") of the sensor device 50, information indicating types of information (for example, "HEARTBEAT RATE AND RESPIRATORY RATE") to be acquired by the sensor device 50 in the subject information, and an acquisition interval (for example, "10 MINUTES") of information to be acquired. Note that, the setting information may store information related to a subject.

As for the acquisition unit 540, the sensor device 50 acquires information from various sensors. For example, the acquisition unit 540 is a device that acquires various information such as biological information and sleep information on a subject. For example, the acquisition unit 540 is a pressure sensor, and the controller 500 can detect the heartbeat and the respiration of a subject on the basis of signals from the pressure sensor. Accordingly, the sensor device 50 can acquire the heartbeat (heartbeat rate) and the respiration (respiratory rate) of a subject.

[1.2.5 Server Device]

FIG. 10 is a diagram illustrating a configuration of the server device 80. The server device 80 includes a controller 800, a memory 810, a communication unit 820, a user interface device 850, and a display 860. Hereinafter, a specific configuration of the server device 80 will be mainly described.

The controller 800 functions as a subject management unit 802, a sensor management unit 804, a subject information memory 806, and a subject state management unit 808 by reading a program from a memory 810 and executing the program. Moreover, the memory 810 stores a subject database (DB) 812 and a sensor database (DB) 814.

The subject management unit 802 manages information related to a subject stored in the subject DB 812. For example, the subject management unit 802 can store a new subject and perform deletion. FIG. 11 is a diagram illustrating one example of the subject DB 812.

The subject DB 812 stores information (basic information) serving as a base in association with subject information. For example, as illustrated in FIG. 11, as information serving as a base, a subject ID (for example, "0003") for identifying a subject, a subject name (for example, "ARAYA Kazuki"), an evacuation site (for example, "ABC ELEMENTARY SCHOOL EVACUATION SITE") in the embodiment, as a place where the subject is currently present, and a group (for example, "A-3") to which the subject belongs, are stored as basic information on the subject. Herein, the basic information on the subject is information that is not changed by the sensor device 50, in the information related to the subject. The basic information may be input by a subject, a staff, or the like, or may be acquired from an electronic medical record server or the like.

The subject information is information based on the sensor information received from the sensor device 50. The subject information memory 806 stores subject information based on the sensor information in the subject DB 812 for every subject. Herein, the subject information includes information (subject information 1) that is stored in a time-series manner, and information (subject information 2) that is stored for every date. Moreover, the subject information includes, in addition to information that is directly obtained from the sensor information, information of a value that is obtained by calculating a value output from the sensor information, a result due to the condition determination, and a result that is estimated by using machine learning.

For example, in a case of a sleeping posture of a subject, the sensor device 50 may determine a sleeping posture of a subject and include the sleeping posture in the sensor information. Moreover, a sleeping posture of a subject determined by any of the first terminal device 10, the second terminal device 20, and the server device 80, on the basis of information (for example, information related to the center of gravity and the pressure) that is output from the sensor device 50, may be stored as the subject information. One or more pieces of the subject information can be stored for each subject.

The sensor management unit 804 manages the sensor DB 814. For example, the sensor management unit 804 links the new sensor device 50 with a subject, or deletes the sensor device 50. As illustrated in FIG. 12, the sensor DB 814 stores a sensor ID in association with a subject ID. Herein, the sensor ID and the subject ID have a many-to-one relation in principle. In other words, with reference to the sensor DB 814, a subject is uniquely determined for every sensor ID. Note that, in some types of the sensor device 50, the subject ID and the sensor ID may have a many-to-many relation. For example, in a case of the sensor device 50 that uses a voice, a plurality of subject IDs may be associated with a sensor ID of a microphone that is the identical sensor device 50. Moreover, sensor IDs of a plurality of microphones may be associated with the identical subject ID.

The subject state management unit 808 manages a state of a subject on the basis of the subject information. For example, the subject state management unit 808 sets an attention range and a warning range for every subject information. Moreover, the subject state management unit 808 sets an attention range of a sleeping position and attention information related to bed departure. Further, the subject state management unit 808 refers to the subject information, and makes a notification in a case where a situation to be notified has been determined.

For example, an example in which the subject state management unit 808 manages a state of a subject on the basis of SpO2 will be described. The subject state management unit 808 sets values related to SpO2 as follows.

Attention range SpO2 more than 93% and less than 96%

Warning range SpO2 equal to or less than 93%

The subject state management unit 808 refers to the subject information, and determines, in a case where a value of SpO2 becomes equal to or less than 93%, that the value of SpO2 has fallen in the warning range and executes notification processing (notification processing of warning). The notification processing makes a notification (notification of warning), for example, by making a notification (mail transmission, pop-up display, and the like) to a terminal device (smartphone) of a staff or the like, or outputting warning sound in the third terminal device 30. Moreover, in a case where the value of SpO2 has fallen in the attention range, the subject state management unit 808 executes the notification processing of attention. As for the notification processing, for example, the notification of attention is performed by performing pop-up display or performing identification display in the third terminal device 30. In this case, in the notification processing, the type of the device that makes a notification may be different between the notification of warning and the notification of attention.

Moreover, in a case where a notification is made, the subject state management unit 808 may change a notification destination or may change a notification content. For example, in a case where a body temperature, a heartbeat rate, and a respiratory rate are notified as notification contents, the subject state management unit 808 makes a notification to an ordinary staff (nurse) as a notification destination. Moreover, in a case where electrocardiogram waveforms are notified as a notification content, the subject state management unit 808 makes a notification to a medical specialist and a nurse (in charge) of the relevant diagnosis and treatment department. Moreover, in a case where the amount of activity and the content related to a posture are notified, the subject state management unit 808 makes a notification to a physiotherapist and an occupational therapist. Moreover, in a case where a notification is made due to a problem of communication, the subject state management unit 808 makes a notification to a clinical psychologist and a social worker. In this manner, the subject state management unit 808 determines in advance notification destinations for respective specialists, and sets a suitable notification destination in accordance with the notification content. Accordingly, subject who receives service can also receive suitable treatment. Moreover, a staff who provides service can also suitably correspond.

In this manner, the subject state management unit 808 performs notification processing for every subject on the basis of the subject information. Accordingly, the subject state management unit 808 can suitably manage a health state and a physical condition of the subject.

Moreover, the subject state management unit 808 may make a notification to a subject who uses the sensor device 50. For example, the subject state management unit 808 transmits signals to the sensor device 50 on the basis of the subject information. When the sensor device 50 receives signals, for example, the sensor device 50 makes a notification to the subject by using vibration, sound, light, and the like. Accordingly, it is possible to notify a subject who does not have subjective symptoms in a change in the physical condition, for example, of the heartbeat being increased and the value of SpO2 indicating an abnormality value.

1.3 Flow of Processing

Subsequently, a flow of the processing in the embodiment will be described.

[1.3.1 Flow of Entire System]

A flow of the processing of the entire system in the embodiment will be described with reference to FIG. 13. FIG. 13 is a sequence diagram illustrating a relation among the sensor device 50, the first terminal device 10, the second terminal device 20, and the server device 80.

FIG. 13 illustrates sensor information by being divided into first sensor information and second sensor information.

The first sensor information is information that is desired to be transmitted by way of a specific terminal device, in other words, in a secure environment. In other words, information that is classified into the first sensor information is, for example, information in which privacy and the like of a subject should be considered. In this case, the sensor device 50 transmits the first sensor information to the server device 80 by way of the first terminal device 10.

Moreover, the second sensor information is information to which the immediacy is requested or the reliability is requested. In this case, the sensor device 50 transmits the second sensor information to the server device 80 by way of the second terminal device 20.

(1) First Sensor Information

A case where the sensor device 50 transmits the first sensor information to the server device 80 will be described. In this case, a program capable of transferring the first sensor information is installed in advance in the first terminal device 10. Moreover, pairing between the sensor device 50 and the first terminal device 10 may be already performed.

The sensor device 50 transmits advertising data indicating a connection type (S1002). The first terminal device 10 having received the advertising data transmits a connection request to the sensor device 50 to attempt to establish the connection, and establishes the connection (S1004). Further, the sensor device 50 transmits first sensor information including subject information to the connected first terminal device 10 (S1006). Herein, one-to-one connection is established between the sensor device 50 and the first terminal device 10, so that it is possible to perform secure communication. Moreover, pairing is performed between the sensor device 50 and the first terminal device 10, so that it is possible to perform communication with higher security.

The first terminal device 10 transmits the received first sensor information to the server device 80 (S1008).

Note that, in a case where the first terminal device 10 establishes connection to a plurality of the sensor devices 50, the first terminal device 10 may transmit, among the subject information received from the sensor devices 50, data in descending order of degree of importance to the server device 80.

For example, when the first terminal device 10 receives the pulse (first sensor information) of a plurality of subjects from the plurality of the sensor devices 50, the first terminal device 10 preferentially transmits data on the subject in descending order of fluctuation of the pulse, to the server device 80.

Moreover, during transmitting first sensor information on a first subject to the server device 80, when the first terminal device 10 has received first sensor information on a second subject with the degree of emergency or the degree of importance higher than that of the first subject, the first terminal device 10 may temporarily stop the transmission of the subject information on the first subject. In this case, the first terminal device 10 resumes the transmission of the first sensor information on the first subject after having transmitted the subject information on the second subject to the server device 80.

The server device 80 stores, on the basis of the received first sensor information, the first sensor information linked with a corresponding subject, as subject information (S1010).

In this manner, after the sensor device 50 and the first terminal device 10 have been connected therebetween (after the secure communication path has been established), the sensor device 50 can transmit the first sensor information by way of the first terminal device 10.

Note that, the second terminal device 20 does not receive the first sensor information transmitted by the sensor device 50. Moreover, even if the second terminal device 20 receives the first sensor information transmitted by the sensor device 50, the second terminal device 20 abandons the first sensor information. Accordingly, the first sensor information is transmitted from the sensor device 50 by way of the first terminal device 10 to the server device 80. Moreover, the first sensor information is not transmitted by way of the second terminal device 20 to the server device 80. Accordingly, in the system 1, the first sensor information can be transmitted by using the secure communication path.

(2) Second Sensor Information

A case where the sensor device 50 transmits the second sensor information to the server device 80 will be described. In this case, the description will be made on the precondition that a program capable of transferring the second sensor information is installed in advance in the second terminal device 20.

Moreover, in FIG. 13, the description will be made by regarding that the first terminal device 10 has a function of transferring, when having received advertising data indicating the broadcast type, the data to the server device 80.

The sensor device 50 transmits advertising data indicating the broadcast type (S1102, S1104). The sensor device 50 transmits the advertising data inclusive of the second sensor information. In other words, the sensor device 50 periodically broadcasts the second sensor information.

Note that, as mentioned above, transmitting the second sensor information in the advertising data indicates that the second sensor information is broadcast. Accordingly, FIG. 13 illustrates a state where the sensor device 50 transmits second sensor information once, and the first terminal device 10 and the second terminal device 20 receive the second sensor information at S1102 and at S1104, respectively.

Herein, in a case where the first terminal device 10 and the second terminal device 20 are present within a communication range of BLE, the first terminal device 10 and the second terminal device 20 respectively receive second sensor information from the sensor device 50 (S1102, S1104). Further, the first terminal device 10 having received second sensor information transmits the second sensor information to the server device 80 (S1106). Moreover, the second terminal device 20 having received second sensor information transmits the second sensor information to the server device 80 (S1108).

Note that, in a case where the second terminal device 20 receives second sensor information from a plurality of the sensor devices 50, the second terminal device 20 may transmit, among the second sensor information received from the plurality of the sensor devices 50, data in descending order of degree of importance to the server device 80.

For example, when the second terminal device 20 receives the body surface temperature (second sensor information) on a plurality of subjects from the plurality of the sensor devices 50, the second terminal device 20 preferentially transmits second sensor information on the subject in descending order of body surface temperature to the server device 80.

Note that, during when the second terminal device 20 transmits second sensor information on a first subject to the server device 80, the second terminal device 20 may temporarily stop the transmission of the second sensor information on the first subject when receiving subject information on a second subject with the degree of emergency or the degree of importance higher than that of the first subject. In this case, the second terminal device 20 resumes the transmission of the second sensor information on the first subject after having transmitted the second sensor information on the second subject to the server device 80.

The server device 80 receives the second sensor information respectively from the first terminal device 10 and the second terminal device 20. In this case, the server device 80 receives the second sensor information from the first terminal device 10 and receives the second sensor information from the second terminal device 20, and the second sensor information is overlapped. Therefore, the server device 80 deletes the overlapped second sensor information (S1010). Further, the server device 80 links subject information with a subject corresponding to the non-overlapping second sensor information, and stores the subject information (S1012).

Note that, although a case where the first terminal device 10 and the second terminal device 20 are present within the range communicable with the sensor device 50 has been described in FIG. 13, in a case of only the second terminal device 20, it goes without saying that the processing may be performed by one device only. In this case, the server device 80 does not need to delete the overlapped data. Moreover, in a case where three or more terminal devices are present within the range communicable with the sensor device 50, only sensor information on one device may be stored, and sensor information on the other devices may be deleted.

In this manner, the sensor device 50 can freely transmit second sensor information to the server device 80 even when the connection between the sensor device and each terminal device is not established. Accordingly, for example, even when the sensor device fails to communicate with the own terminal device (the first terminal device 10) or the communication with the terminal device (the first terminal device 10) is out of range of the communication, the sensor device can transmit sensor information to the server device 80 by using any terminal device.

[1.3.2 Sensor Device Setting Processing]

Processing of setting an operation of the sensor device 50 will be described with reference to FIG. 14. The processing in FIG. 14 is processing that is executed by the terminal device (for example, the first terminal device 10) having a setting function of the sensor device 50.

Firstly, the controller 100 of the first terminal device 10 establishes connection to the sensor device 50 (Step S104). Note that, pairing between the first terminal device 10 and the sensor device 50 may be set. The pairing between the two devices may be set by using a standard function of an operating system (OS, for example, ios (registered trademark), Android (registered trademark), and Windows (registered trademark)), or may be executed by an original scheme.

Note that, although Step S104 will be described by assuming a case where the first terminal device 10 and the sensor device 50 are connected by the near field communication (for example, BLE), the first terminal device 10 and the sensor device 50 may be connected by another communication scheme. For example, in this processing, for example, the wireless LAN may be used or a USB cable may be used, for the connection between the first terminal device 10 and the sensor device 50.

Subsequently, the controller 100 sets a communication mode of the sensor device 50 (Step S106; for example, R104 in FIG. 18). Herein, either or both of the "CONNECTION TYPE" and the "BROADCAST TYPE" can be selected as the communication mode.

Although various selection methods can be considered, for example, as illustrated in the region R104 in FIG. 18, which is described later, the controller 100 displays a selection box in a display screen W100. A user checks a field of "DEVICE BELOW" in a case where a specific device is set as a transmission destination. If the relevant field is checked, the controller 100 determines that the "CONNECTION TYPE" has been selected, and sets the communication mode as "CONNECTION TYPE".

Moreover, if the user checks a field of "BROADCAST PERMISSION", the controller 100 determines that "BROADCAST TYPE" has been selected, and sets the communication mode as "BROADCAST TYPE".

Herein, the two fields are check boxes, so that the user can select both. In a case where both have been selected, the controller 100 may select the communication mode as "BOTH" or "CONNECTION TYPE/BROADCAST TYPE".

Moreover, only either one of the two communication schemes may be selected. In this case, the controller 100 may display a radio button, instead of a check box of the region R104. Moreover, in a case where nothing is selected, the controller 100 may perform display "PLEASE SELECT EITHER ONE" to prompt the user.

Subsequently, in a case where the sensor device 50 is currently set to the connection type communication or set to both, the controller 100 sets a transmission destination to which sensor information is transmitted (Step S108; Yes→Step S110). In other words, the controller 100 sets information on the first terminal device 10 to which sensor information is transmitted as a transmission destination. For example, in the region R**104*a* of FIG. 18, the controller 100 selects a terminal device (the first terminal device 10**) serving as a transmission destination.

Note that, the controller 100 may set a plurality of transmission destinations to which the sensor device 50 transmits sensor information. Note that, in a case where the sensor device 50 is set to the broadcast type communication, the sensor device 50 does not transmit sensor information to a specific transmission destination. Accordingly, the controller 100 does not need to set a transmission destination of sensor information from the sensor device 50, but may set the degree of priority of the second terminal device 20 to which the sensor information is broadcast. For example, the second terminal device 20 serving as a broadcast destination may be set to a terminal device that is owned by the family.

Subsequently, the controller 100 sets information to be acquired by the sensor device 50 (Step S112; a region R106 in FIG. 18). For example, the controller 100 designates necessary information among acquirable information. The controller 100 may designate all the information acquirable by the sensor device 50, or may select one or a plurality. For example, the controller 100 may select acquiring biological information such as the heartbeat (rate) and the respiration (rate), or may select acquiring information related to sleep such as a sleep period.

Moreover, the controller 100 may set acquisition timing together (a region R108 in FIG. 18). For example, the controller 100 may set an interval of acquisition time, for example, biological information is acquired for every one minute, acquired for every five minutes, or acquired for every ten minutes.

The controller 100 stores these set contents in the setting information storage area 114 as setting information. Moreover, the controller 100 transmits the setting information to the sensor device 50. When the sensor device 50 receives setting information, the sensor device 50 stores the setting information in the setting information storage area 514.

Note that, the controller 100 may transmit setting information to the sensor device 50 by another method. For example, in the first terminal device 10, the controller 100 generates setting information. Further, the first terminal device 10 may transmit the setting information to the sensor device 50. In this case, as a method of transmitting setting information from the first terminal device 10 to the sensor device 50, for example, Near Field Communication (NFC) serving as near field communication may be used.

[1.3.3 Sensor Device Processing]

Subsequently, an operation of the sensor device 50 will be described with reference to FIG. 15. Firstly, the controller 500 of the sensor device 50 refers to setting information, and determines whether connection type communication is performed (Step S202). Specifically, the controller 500 refers to setting information, and determines whether the communication scheme is set as "CONNECTION TYPE COMMUNICATION" or set as "BOTH".

If performing the connection type communication is set by the setting information (Step S202; Yes), the controller 500 determines whether connection to the terminal device (the first terminal device 10) serving as a connection destination has been established (Step S206). Herein, if the connection has not been established, the controller 500 temporarily ends the processing without transmitting the sensor information (Step S206; No).

If the connection to a terminal device (the first terminal device 10) serving as a connection destination is established, the sensor device 50 transmits sensor information to the terminal device (Step S206; Yes→Step S208).

On the other hand, if performing the connection type communication is not set by the setting information, in other words, if the broadcast type communication is set (Step S202; No), the controller 500 determines whether the broadcast transmission is possible (Step S210).

If sensor information to be distributed by the broadcast is present, the controller 500 broadcasts the sensor information (Step S210; Yes→Step S212). Specifically, the sensor device 50 transmits advertising data inclusive of sensor information to another terminal device (the second terminal device 20).

Note that, the sensor device 50 may temporarily store sensor information, in preparation for a deficit of the sensor information. For example, when the communication of the connection type is performed, the sensor device 50 transmits sensor information at Step S208, and stores the sensor information in the sensor information storage area 512. Further, the sensor device 50 may delete the sensor information when having received a signal from the first terminal device 10. Moreover, the sensor device 50 may retransmit the sensor information to the first terminal device 10 when not receiving a signal from the first terminal device 10 within a predetermined time.

Moreover, when the first terminal device 10 has received sensor information from the sensor device 50, the first terminal device 10 may transmit a signal of reception to the sensor device 50. Moreover, the first terminal device 10 may transmit a signal to the sensor device 50, at timing when the sensor information has been deleted from the device, at timing when the first terminal device 10 has transmitted the sensor information to the server device 80, or at timing when the server device 80 has notified the first terminal device 10 of the reception of the sensor information.

Moreover, when the communication of the broadcast type is performed, the sensor device 50 broadcasts sensor information at Step S212, and stores the sensor information in the sensor information storage area 512.

When the server device 80 has received sensor information transmitted by the communication of the broadcast type from the first terminal device 10 and/or from the second terminal device 20, the server device 80 transmits a signal of reception to a transmission source. The first terminal device 10 or the second terminal device 20 having received the signal from the server device 80 transmits a signal indicating that the sensor information has been appropriately received, by the communication of the broadcast type. When receiving the signal indicating that the sensor information has been appropriately received, the sensor device 50 deletes the sensor information. Note that, the first terminal device 10 or the second terminal device 20 may broadcast, at the timing when having received the sensor information transmitted by the communication of the broadcast type, a signal indicating the reception to the sensor device 50.

[1.3.4 Storage Processing of Sensor Information]

Storage processing of sensor information in the server device will be described with reference to FIG. 16. The controller 800 of the server device 80 receives sensor information via the communication unit 820 (Step S302; Yes). Herein, the controller 800 specifies a subject from the sensor information. Herein, as a method of specifying a subject, the following two methods can be considered.

(1) Subject is Specified from Subject ID Included in Sensor Information

For example, in a case where sensor information is transmitted by the communication scheme of the connection type, a subject ID may be included in the sensor information. In this case, the controller 800 directly extracts a subject ID from the sensor information, and specifies a subject serving as a destination to which the sensor information is recorded. Note that, in a case where personal information (for example, a name and the like of the subject) is referred, the controller 800 can specify specific personal information by referring to the subject DB 812.

(2) Subject is Specified from Sensor Device ID Included in Sensor Information

For example, in a case where sensor information is transmitted by the communication scheme of the broadcast type, a subject ID is not included in the sensor information. In this case, the controller 800 extracts a sensor device ID included in the sensor information. Further, the controller 800 refers to the sensor DB 814 to read a subject ID, and specifies a subject.

(3) Subject is Specified from Information on First Terminal Device 10

The controller 800 specifies a subject ID from information on the first terminal device 10 having transmitted sensor information. For example, the sensor device 50 includes information on the first terminal device 10 serving as the transmission destination in the sensor information, or the first terminal device 10 includes identification information in the sensor information when the first terminal device 10 transfers the sensor information (when the first terminal device 10 transmits the sensor information to the server device 80). Further, the controller 800 specifies a subject ID on the basis of the identification information on the first terminal device 10. Note that, a correspondence between the identification information on the first terminal device 10 and the subject ID may be stored in advance in the subject DB 812, or may be included as another data.

Subsequently, the controller 800 determines whether the received sensor information overlaps each other (Step S306). For example, in a case where information included in the sensor information perfectly matches each other or predetermined items match each other, the controller 800 determines overlapping of the sensor information. Moreover, the controller 800 may determine whether the sensor information overlaps each other by using identification information allocated for every sensor information.

Further, if the sensor information does not overlap each other, the controller 800 extracts subject information from the sensor information, and stores the subject information in the subject DB 812 (Step S306; No→Step S308). Moreover, if the sensor information overlaps each other, the controller 800 deletes the overlapped subject information (Step S306; Yes→Step S310).

Note that, as a method of deleting sensor information by the server device 80, the controller 800 may delete data at the early order of reception with priority. For example, the controller 800 may store the earliest received data, and delete the data received thereafter.

Moreover, the server device 80 may delete the sensor information in accordance with the degree of priority of the second terminal device 20. For example, the server device 80 stores the overlapped sensor information for a constant period, and determines whether the overlapped data is received. Herein, the server device 80 preferentially stores data of the second terminal device 20 with a high degree of priority from which sensor information has been transmitted. For example, among the second terminal devices 20, the high degree of priority is set to a terminal device that repeatedly transmits the sensor information and a terminal device (for example, a terminal device of the family) that is set by a subject.

Moreover, in a case where sensor information including the subject information of the same type as that of the second terminal device 20 is received from the first terminal device 10, the server device 80 may give priority to the sensor information received from the first terminal device 10. For example, in a case where a value of SpO2 included in the sensor information is a value received from a pulse oximeter in the first terminal device 10 and a value received from a smart watch in the second terminal device 20, the server device 80 receives sensor information including the value of SpO2 from each terminal device. In this case, if the two values of SpO2 are included in a predetermined time range, the server device 80 may store the value of the first terminal device 10 with priority.

Moreover, the server device 80 may preferentially store sensor information received from the first terminal device 10 and the second terminal device 20 with the high degree of priority, and may store, in a case where the relevant sensor information cannot be received, sensor information from the second terminal device 20 with the low degree of priority.

[1.3.5 Display Processing in Third Terminal Device]

Subsequently, one example of display processing in the third terminal device 30 will be described with reference to FIG. 17. The controller 300 acquires information related to a subject from the server device 80, or if necessary, from the subject DB 812, and executes processing.

Firstly, the controller 300 specifies a display area including a subject to be displayed on the display 360 (Step S402). For example, the controller 300 selects an evacuation site, an evacuation area, and a group in the evacuation site and the evacuation area.

Subsequently, the controller 300 list displays a subject information (Step S404). The controller 300 specifies a subject to be displayed at Step S402, and displays biological information such as the heartbeat rate, the respiratory rate, the body temperature, SpO2, and the amount of activity, for example, as subject information on the specified subject.

Note that, the controller 300 may perform identification display corresponding to a value of biological information when displaying each biological information. For example, the controller 300 may display a graph in accordance with values of the biological information or display the values in different colors.

In particular, the controller 300 identification displays subject information in a warning state (Step S406). The controller 300 identification displays, for example, among biological information values, a biological information value in a warning state so as to indicate the warning state. For example, when SpO2 is below a predetermined value (for example, 93%), the controller 300 may identification display the SpO2 so as to indicate the warning state.

Moreover, in a case of the warning state, the controller 300 may perform not only the identification display but also may perform pop-up display, may sound alert sound, or may output an alarm to another device (for example, a terminal device that is owned by a staff), for example.

When one subject is selected among the subjects list displayed, the controller 300 displays an individual screen (Step S408; Yes→Step S410). For example, detailed subject information may be displayed or past history may be displayed on the individual screen. Moreover, past history may be displayed as a graph or the like on the individual screen.

Herein, in a case where a return operation is performed, the controller 300 executes the processing again from Step S402 (Step S412; Yes→Step S402). In other words, the controller 300 switches a screen to the list display from the individual screen.

Moreover, an operation to display a sleep state is selected in a state where the individual screen is displayed, the controller 300 displays a screen including information related to sleep (Step S412; No→Step S414; Yes→Step S416). For example, the screen including the information related to sleep may be a screen on which a sleep diary showing bedtime and wake-up, and sleeping and awakening as a graph, a sleep period, a respiratory rate during sleep, and a heartbeat rate during sleep are displayed. Moreover, a graph indicating transition of these values in the past may be displayed on the screen including the information related to sleep.

Further, in a case where a return operation is performed in this time, the screen may be returned to a previous screen. For example, when the screen including information related to sleep is displayed, if a return operation is performed, the individual screen is again displayed (Step S418; Yes→Step S410).

1.4 Operation Example

Hereinafter, an operation example using a screen example will be described. FIG. 18 is a diagram illustrating one example of the display screen W100 in a case where the sensor device 50 is set in the first terminal device 10.

A subject name and a subject ID are displayed in a region R100 on the display screen W100 as information related to a subject.

Moreover, information on the sensor device 50 to be currently set is displayed on the display screen W100. Pairing with the sensor device 50 is already performed, and the sensor device 50 is in a connectable state or a connected state.

A name and a sensor device ID of the sensor device 50 are displayed in a region R102 on the display screen W100. Moreover, a communication scheme is displayed so as to be selectable in the region R104. For example, a subject himself/herself can select whether "BROADCAST TYPE" is permitted as a communication scheme of the sensor device 50 or a specific device (in other words, connection type). Moreover, in a case where a specific device is selected, a device to which the sensor device 50 is currently connectable can be selected. Moreover, both of the two communication schemes may be selected.

Moreover, in the region R106, one or a plurality of information to be acquired can be selected. Moreover, in the region R108, an interval at which information is acquired can be selected. The interval at which information is acquired may be any interval.

FIGS. 19 to 23 illustrate examples of display screens in the third terminal device 30. An operation in a case where a staff such as a health care worker uses the third terminal device 30 to manage evacuees and the like will be described.

FIG. 19 illustrates one example of a display screen W120 that is displayed in the third terminal device 30. In the display screen W120, an upper region where a title and a menu are displayed and a region below where information is displayed are allocated.

Moreover, various information is displayed in the region where information is displayed. For example, an evacuation site is displayed in a region R120. Moreover, a tab for switching a group in the evacuation site is displayed in a region R122. The staff or the like can switch the list display of subjects that is displayed at the right side by selecting the tab.

The list of the subjects is displayed in a region L120. A plurality of subjects are list displayed to provide a display screen with which the staff or the like manages biological information on the plurality of the subjects with high convenience.

In the region L120, each subject is displayed in one line. For example, in a region L122, subject information on "ARAYA Kazuki" is displayed. As subject information, a sleep period, a body surface temperature (body temperature), an amount of activity, SpO2, and a pulse rate are displayed on the display screen W120. Moreover, the body temperature is displayed as an icon, so that the staff or the like easily visually identifies risk when viewing the display, and the amount of activity is graph displayed in addition, thereby providing the display screen with high viewability.

Herein, subject information in the warning state is identification displayed. FIG. 20 illustrates one example of an identification displayed display screen W140. For example, an identification display M140 indicates a number in a place of a tab, and indicates the number of the warning states present in the subject information included in the relevant tab. Moreover, on the display screen W140, an identification display M142 (inversed display) is made because "SpO2" in "ARAYA Kazuki" indicates an abnormal value. Herein, the identification display may be inversed display or boxed display, or may be displayed with a different color. Moreover, the identification display may be displayed as blinking display.

A tab B is selected on the display screen W140 to obtain a display screen W160 in FIG. 21. In the display screen W160, an identification mark of the tab clearly indicates that the number of subject information in the warning state is two. Moreover, when actual subjects are list displayed, identification displays (inversed displays) are made in two locations of the subject information, so that it is possible to immediately grasp that the subject information is in the warning state.

Note that, in a case where individual information in the region L122 is selected on the display screen in FIG. 19, the display screen transitions to a display screen W200 in FIG. 22. The display screen W200 is an individual screen, and displays only information on one subject.

For example, a name, an evacuation site, and an area of the subject is displayed in a region R202 on the display screen W200. Moreover, a message may be displayed in a region R204. As one example, four graphs are displayed in the display screen W200. For example, a graph G202 indicating transition of the body temperature, a graph G204 indicating transition of the amount of activity, a graph G206 indicating transition of the SpO2, and a graph G208 indicating transition of the pulse rate are displayed on the display screen W200.

The most recently acquired value is displayed above each graph. For example, in the graph G202, the body surface temperature "36.9° C." is a body temperature most recently acquired by the sensor device 50. Note that, as the biological information value, not only the most recent value but also the real-time value may be displayed or the highest value (or the lowest value) may be displayed, for example.

Moreover, as a type of the graph, various graphs can be displayed. As one example, polygonal line graphs and a bar graph are displayed on a display screen W210 in FIG. 22.

Moreover, various combinations of the polygonal line graph and the bar graph are possible by setting. For example, one polygonal line graph is displayed in a time-series manner in each of the graph G202 and the graph G208 on the display screen W200. Note that, in the graph G202, the shape of a dot is changed for every measurement time. For example, a black dot indicates 9 o'clock in the morning and a white triangle indicates 17 o'clock in the evening. Moreover, in the graph G206, a plurality of polygonal line graphs are displayed in a stacked manner. Moreover, in the graph G204, a bar graph is displayed. The displays of these graphs can be changed by setting. In the embodiment, for convenience of the description, graphs of a plurality of types are displayed, but the graphs may be standardized and displayed in the same type.

Moreover, in the display screen W200, a sleep period is displayed in the region R204, and a display button B202 for displaying information related to the sleep period is displayed. Moreover, in the display screen W200, a button B204 for saving the relevant screen, or saving (storing) a manually input value of the subject information is displayed.

Herein, in a case where the display button B202 related to the sleep period is selected by a user, the display screen W200 transitions to a display screen W220 in FIG. 23. A graph G222 indicating the sleep diary, a graph G224 indicating the sleep period, a graph G226 indicating the respiratory rate during sleep, and a graph G228 indicating the heartbeat rate during sleep are displayed on the display screen W220.

In this manner, with the embodiment, it is possible to easily grasp a state of a subject by using the third terminal device 30.

2. Second Embodiment

Subsequently, a second embodiment will be described. The second embodiment is an embodiment in which various information can be displayed in the first terminal device 10. Note that, in the present embodiment, description of points in the configuration and the processing common to those in the first embodiment will be omitted, and different points will be mainly described.

FIG. 24 illustrates processing that is executed by the first terminal device 10 in the embodiment. Note that, the first terminal device 10 in the embodiment is capable of performing the connection type communication, and is capable of performing the broadcast type communication.

The controller 100 determines whether advertising data is data indicating the connection type or data indicating the broadcast type. Further, if advertising data is data indicating the connection type, the controller 100 determines first sensor information as described in FIG. 13, establishes connection, and receives the sensor information (Step S502; Yes).

Subsequently, the controller 100 displays biological information (value) included in subject information from the sensor information on the display 160 (Step S504). Further, the controller 100 causes a subject to input a note if necessary (Step S506), and transmits the input note and the sensor information together to the server device 80 (Step S508).

For example, FIG. 25 illustrates one example of a display screen in a case where biological information is displayed in the first terminal device 10. A value of SpO2 and a value of the heartbeat rate are displayed, and a note field is provided below. The subject fills in note in the note field by himself/herself, so that the content of the note is stored together with the subject information.

Moreover, if an operation to display the subject information is performed, the first terminal device 10 executes the subject information display processing (Step S510; Yes→Step S514). For example, the first terminal device 10 may be able to switch and display a transition graph (for example, FIG. 26(*a*)) of SpO2 of the subject, a transition graph (for example, FIG. 26(*b*)) of the heartbeat rate of the subject, a transition graph (for example, FIG. 26(*c*)) of the body temperature of the subject, and a transition graph (for example, FIG. 26(*d*)) of the amount of activity of the subject.

Note that, FIG. 26(*a*) is a diagram illustrating transition of SpO2 of the subject, and illustrates the transition in two time zones. In the graph of FIG. 26(*a*), at a first (6/2) time point, lower and upper graphs illustrate the transition of SpO2 at 9 o'clock and SpO2 at 17 o'clock, respectively. FIG. 26(*b*) is a diagram illustrating transition of the heartbeat rate of the subject, and illustrates the transition in two time zones. In the graph of FIG. 26(*b*), at the first (6/2) time point, the lower and upper graphs illustrate the transition of the heartbeat rate at 9 o'clock and the heartbeat rate at 17 o'clock, respectively.

Moreover, when the first terminal device 10 receives advertising data indicating the broadcast type, the first terminal device 10 determines second sensor information described in FIG. 13, and transfers the advertising data to the server device 80 (Step S516→Step S518). In other words, the advertising data includes sensor information, and the first terminal device 10 transmits the sensor information to the server device 80.

Note that, in a case where the first terminal device 10 is a terminal device that is owned by a staff or the like such as a health care worker, the first terminal device 10 may have a function capable of checking biological information. For example, biological information transferred by the first terminal device 10 is displayed on a display screen in FIG. 27. Although the name is displayed as USER because sensor information distributed by the broadcast does not include information that specifies a user, an identification number corresponding to an ID of the sensor device is displayed as a serial.

Moreover, in FIG. 27, among biological information values of each subject, the body temperature and SpO2 are displayed. In a case where an abnormal value is present, the staff can make an inquiry to the server device 80 by tapping each subject. Specifically, the first terminal device 10 makes an inquiry about information on the selected subject to the server device 80. At this time, the server device 80 authenticates whether the user of the first terminal device 10 is a person, such as the staff, who has the authority to display information on a third party. If the server device 80 was able to authenticate the staff having the authority, the server device 80 transmits information in accordance with a content of the inquiry. For example, the server device 80 can acquire detailed biological information related to a subject who specifically causes a problem, and transition of the biological information. Moreover, the staff may display the display screen as in FIG. 26 about the selected subject by using the first terminal device 10.

3. Third Embodiment

Subsequently, a third embodiment will be described. In the first embodiment, as the communication scheme of the sensor device 50, whether the connection type or the broadcast type is selected in accordance with the subject and the like. The present embodiment is an embodiment in which "AUTOMATIC" is selected, whereby the sensor device 50 transmits sensor information by switching the communication scheme, as appropriate.

The processing in FIG. 15 is replaced with that in FIG. 28 in the embodiment. The same processing is denoted by the same reference numeral, and description thereof is omitted.

Firstly, the controller 500 determines whether the sensor information of the type has a low degree of importance or high immediacy (Step S220).

In other words, the controller 500 determines whether the sensor information corresponds to first sensor information or corresponds to second sensor information described in FIG. 13. Further, the controller 500 transmits the sensor information determined as first sensor information by the communication scheme of the connection type. Moreover, the controller 500 transmits the sensor information determined as second sensor information by the communication scheme of the broadcast type.

Herein, the secure communication scheme is preferable for information including personal information, which corresponds to the first sensor information. For example, information acquired by the sensor device 50 equivalent of a medical device corresponds to the first sensor information. Moreover, the subject may specify any item as the first sensor information.

Moreover, information with high immediacy and information that aims at preventing a deficit of data correspond to the second sensor information. For example, in a case of sleeping time, a body of a subject himself/herself becomes an obstacle, and a communication path cannot be established with the first terminal device 10. In this case, data can be more reliably transmitted when sensor information is transmitted by the broadcast type.

Moreover, information with high emergency may be set as second sensor information. For example, the heartbeat rate is normally set as first sensor information, however, in a case where the heartbeat rate has become a numerical value to be warned, the heartbeat rate may be more reliably transmitted to the server device 80 as second sensor information.

Moreover, information on the sensor may be divided into first sensor information and second sensor information depending on the amount of data. For example, the controller 500 may transmit simple data of the small amount, such as the heartbeat rate, the respiratory rate, the body temperature, the amount of activity, SpO2, and the sleep period, as second sensor information. Moreover, the controller 500 may transmit data of the large amount, such as continuous waveform data of the electrocardiogram and continuous waveform data of the respiration, as first sensor information.

Moreover, in a case where the sensor device 50 in the embodiment cannot perform the connection type communication, the sensor device 50 may perform the communication by switching to the broadcast type communication. For example, if the sensor device 50 cannot establish connection to the first terminal device 10 serving as a connection destination (Step S206; No), the sensor device 50 may transmit sensor information by the communication scheme of the broadcast type (Step S210; Yes→Step S212).

Note that, in a case where the communication with the first terminal device 10 has been cut on the way, the sensor device 50 may transmit sensor information by the communication scheme of the broadcast type. Moreover, in a case where the connection to the first terminal device 10 has been established during the transmission of the sensor information by the communication scheme of the broadcast type, the sensor device 50 may transmit the sensor information to the first terminal device 10 by the connection type communication.

Moreover, the sensor device 50 may execute Step S208 and Step S212 in FIG. 28 as parallel processing. For example, the sensor device 50 transmits information determined as information with the high degree of importance and information selected by the subject at Step S220, to the first terminal device 10 by the communication of the connection type. Moreover, the sensor device 50 transmits information with the low degree of importance, information not specially selected by the subject, and information with high immediacy, by the communication of the broadcast type.

In this manner, the sensor device 50 may use the two communication schemes in parallel. The sensor device 50 may automatically switch the two communication schemes or may simultaneously use the communication schemes, when using the two communication schemes in parallel. In this case, the sensor device 50 may be provided with a plurality of the near field communication units 530.

4. Fourth Embodiment

Subsequently, a fourth embodiment will be described. The fourth embodiment is an embodiment in which the server device 80 advises in accordance with a transfer situation of the second terminal device 20. Note that, in the present embodiment, description of points in the configuration and the processing common to those in the first embodiment will be omitted, and different points will be mainly described. FIG. 29 is a diagram illustrating processing of the server device 80 in the fourth embodiment.

The controller 800 aggregates terminal devices having received sensor information (Step S600). Herein, if a terminal device in a short distance is present among the second terminal devices 20 other than the subject, the controller 800 executes first notification processing (Step S602; Yes→Step S604).

For example, the controller 800 aggregates the transfer rate of sensor information on a subject for every second terminal device 20. The controller 800 can determine that the contact frequency to the subject is higher as the transfer rate is higher. Moreover, in a case where the transferred sensor information includes the radio field intensity and a distance to the sensor device 50, the controller 800 can determine that the subject is in a short distance. Accordingly, the controller 800 can make a notification or the like of a close contact person with an infectious disease (for example, COVID-19).

Moreover, the controller 800 determines the number of sensor devices having transmitted sensor information that is transferred by the second terminal device 20, and determines whether a change is within a predetermined range (Step S406). If the change in the terminal device is within the predetermined range, the controller 800 executes second notification processing (Step S606; Yes→Step S608).

For example, in cases where the change in the second terminal devices 20 that transfer sensor information is small, it is understood that the subject transmits sensor information always from the same place or the narrow range where the same second terminal device 20 is connectable even if the subject moves. The fact that the change in the second terminal devices 20 that transfer sensor information is small means, for example, such as that the type of the terminal device around the subject for the second terminal devices 20 (for example, the type and the like of the terminal device that is specified from the identification information on the terminal device) is not changed, and/or that the number of the second terminal devices 20 that transfer sensor information is not changed. The controller 800 determines a high occurrence risk of a disuse syndrome because the subject does not move, and makes a notification of an increased risk of developing of depression due to a shortage of communication.

Note that, the operation in the embodiment executed by the server device 80 has been described, but may be executed by the first terminal device 10 and the third terminal device 30 that are owned by persons with the authority such as staffs or the like.

5. Application Example and Effect

This system can be effectively used for physical condition management and the like of the evacuees in the shelter, for example.

For example, vital data (example: measurement data by a medical device) corresponding to personal information for which consideration is necessary is transmitted to the server device 80 using a dedicated gateway or the first terminal device 10 such as a personal smartphone of a relevant person, and the other data can be broadcast from the sensor device 50, and the other data can be transmitted together with data on persons other than the relevant person from the second terminal device 20 such as a smartphone that is owned by an evacuee to the server device 80.

The broadcast data includes identification information on the sensor device 50 and vital data, and the server device 80 links the sensor device 50 with the subject, whereby the vital data is associated with personal information for the first time.

Moreover, in this system, the network is locally set in the shelter (example: Local 5G), and the linkage between identification information on the sensor device 50 and identification information on the subject can be browsed only in the local environment, so that it is possible to construct a more secure environment.

Moreover, in this system, data can be received by all the terminal devices (smartphones) present in the shelter, so that it is possible to prevent the occurrence frequency of a data deficit due to a human body.

Moreover, in this system, a terminal device such as a smartphone of an evacuee is used, so that it is possible to minimize the installation of a gateway.

In this manner, the shelter is an environment where a mutual aid by a local community works. Therefore, an evacuee having a terminal device such as a smartphone installs in advance a dedicated application. In this system, data on an environment installation type sensor or a wearable sensor can be transmitted to the server device from the various routes by the dedicated application in the shelter. Accordingly, in this system, even a person who does not have a terminal device such as a smartphone can transmit data to the server device in real time, and it is possible to construct a system that minimizes data communication blackout.

Moreover, in this system, data acquired from a wearable sensor is broadcast by a beacon scheme for every certain period of time. A gateway and a smartphone having acquired data respectively transfer the data to the server device, and the server device discards, in a case where overlapped data of the same ID is present, the overlapped data.

Moreover, it is difficult to protect personal information because data is probably received by various terminals, in the broadcast transmission only. Therefore, a communication environment in which information is not externally leaked is constructed for a device that acquires vital data corresponding to personal information need to be considered, by pairing. The server device can manage and operate this data and the other broadcast data under the same environment.

In this system, to attain a more secure environment for broadcast data, a local network (example: Local 5G) is constructed between the server device and the gateway/smartphone, and a file in which a data ID (an ID or the like of the sensor device) is linked with an individual ID can be managed in the shelter (for example, the server device). Accordingly, as this system, a system that solves a risk of a leakage of information related to an individual person, except persons concerned, can be constructed.

Moreover, some data to be used is obtained from a medical device, and some data to be used is obtained from a non-medical device. In this system, information from the medical device can be used.

Moreover, data present in the server device may be browsable in a medical institution and the like. Accordingly, a medical instruction based on a screening result can be provided from a health care worker to an evacuee or an on-site staff in the shelter. In other words, physical condition management and guidance can be remotely conducted as well in the shelter where a few health care workers are present.

In this manner, this system can correspond to the physical condition management of persons concerned in the shelter, which has been conventionally difficult to conduct, without manual labor.

Moreover, in the shelter on the precondition of cooperation, this system can correspond by using a smartphone of an evacuee, with no expenditure of labor and cost.

Moreover, the sensor device can be connected to a terminal device such as a smartphone that is owned by a subject by using near field communication, for example, Bluetooth Low Energy (BLE). By using BLE for communication with the terminal device, the sensor device can perform power saving communication, and perform a design in consideration of the battery capacity.

Even in a case where near field communication is used by using BLE, the sensor device in the embodiment can transmit subject information to the server device without causing a deficit of data. Generally, there is such a problem that the communication with the terminal device such as a smartphone is likely to be cut due to characteristics of radio waves in BLE. This is because radio waves in BLE cannot pass through a human body of a subject, and thus the communication is cut in a layout in which the body is positioned between the sensor and the smartphone during when the subject is sleeping in some cases, for example. In this manner, there has been a problem in the sensor device that the communication with the terminal device is cut depending on the posture of the subject. When the communication between the sensor device and the terminal device is cut, such a problem has been caused that the sensor device cannot transmit data to the server device to cause a deficit of data for a long period of time.

However, the sensor device in this system can reliably transmit data by transmitting subject information by broadcasting in such a case. The sensor device broadcasts subject information, and any of the terminal devices may transmit the subject information to the server device. Therefore, the server device can prevent a deficit of data of the subject information from occurring.

6. Modified Example

The embodiments of the invention have been described in detail with reference to the drawings, however, the specific configuration is not limited to the embodiments, and includes designs and the like that do not depart from the gist of the invention in the claims.

Moreover, the techniques disclosed in the abovementioned embodiments, application examples, operation examples, and modifications are intended to be implemented alone or in combination as much as possible.

Moreover, the program that operates in each device in the embodiments is a program that controls a CPU or the like (a program that causes a computer to function) so as to implement the functions in the abovementioned embodiments. Further, the information that is handled by these devices is temporarily stored in a temporary storage (for example, RAM) at the time of processing, and thereafter stored in various ROM and HDD storage devices, and is read and corrected/written by the CPU as necessary.

Further, in a case of distribution to the market, the program can be stored and distributed in a portable non-temporary recording medium, or transferred to a server computer connected via a network such as the Internet. In this case, a storage device of the server computer, of course, falls within the present invention.

Moreover, although the communication scheme using BLE has been described in the abovementioned embodiments, a different communication scheme or a combination of different schemes may be employed. For example, in a case where data with high emergency is transmitted, a Wi-Fi communication scheme may be used, instead of the BLE communication. In this case, second sensor information may be transmitted by the wireless LAN. Moreover, a wireless LAN serving as a third communication scheme may be combined.

Moreover, in the abovementioned embodiments, in a case where a communication scheme different from a communication scheme that uses BLE is used, as for the communication of the connection type/the communication of the broadcast type, the communication of the connection type/the communication of the connectionless type may be used.

Moreover, the abovementioned first terminal device 10 and second terminal device 20 are may be switched in accordance with the connection frequency. For example, in a case where the second terminal device 20 having connected a plurality of times is present, the second terminal device 20 may be switched to the first terminal device 10. Specifically, in a case where the same second terminal device 20 transfers sensor information, the system 1 may recommend that the second terminal device 20 is set as a communication destination of the connection type communication.

Note that, the abovementioned processing may be ended at any timing. For example, the execution of a program may be ended, or the processing may be returned to a previous step or returned to a previous operation screen at timing when a cancellation signal is input by a subject (user), a staff, or a system. For example, the processing flow in FIG. 17 can be ended at any timing as well.

REFERENCE SIGNS LIST

1 System
10 First terminal device
100: Controller
102 Setting unit; 104 Transfer controller; 106 Subject information display
110: Memory
112 Sensor information storage area; 114 Setting information storage area; 116 Subject information storage area
120: Communication unit
130: Near field communication unit
150: User interface device
160: Display
20 Second terminal device
200: Controller
202: Transfer controller
210: Memory
212 Sensor information memory
220: Communication unit
230: Near field communication unit
250: User interface device
260: Display
30 Third terminal device
300: Controller
302 Subject information display controller; 304 Subject state management unit
310 Memory
312 Subject information storage area
320 Communication unit
350 User interface device
360 Display
50 Sensor device
500 Controller
502 Sensor Information Transmitter
510 Memory
512 Sensor information storage area; 514 Setting information storage area
530: Near field communication unit
540 Acquisition unit
80 Server device
800 Controller
802 Subject management unit
804 Sensor management unit
806 Subject information memory
808 Subject state management unit
810 Memory
812 Subject DB
814 Sensor DB
820 Communication unit
850 User interface device
860 Display

The invention claimed is:

1. A system comprising:
a sensor device that transmits acquired sensor information; and
a terminal device that transmits the sensor information received from the sensor device to a server device, wherein
when the sensor information is transmitted by a connection type, a first terminal device having established communication with the sensor device transmits the sensor information to the server device, and
when the sensor information is transmitted by a broadcast type, a second terminal device having received the sensor information transmits the sensor information to the server device, wherein the server device determines a state of a subject based on the terminal device that has transmitted the sensor information transmitted by the connection type.

2. The system according to claim 1, wherein the terminal device sets a terminal device as a transmission destination of the sensor information by the connection type, with respect to the sensor device.

3. The system according to claim 1, wherein the server device deletes, when the sensor information transmitted by the broadcast type is transferred from a plurality of the terminal devices, the overlapping sensor information.

4. The system according to claim 1, wherein the server device determines the state of the subject from a distance between the sensor device and the terminal device or a transfer rate of the sensor information from the sensor device.

5. The system according to claim 4, wherein a notification is made when the distance between the sensor device and the terminal device is shorter than a predetermined distance or the transfer rate of the sensor information from the sensor device is higher than a predetermined transfer rate.

6. The system according to claim 1, wherein the server device determines the state of the subject from a change in a second terminal device that has transmitted sensor information transmitted from the sensor device.

7. The system according to claim 6, wherein a notification is made when the second terminal device that has transmitted the sensor information is a terminal device of the same type or the number of the second terminal devices that have transmitted the sensor information does not change.

8. The system according to claim 1, wherein the terminal device temporarily stops, when receiving sensor information with a high degree of emergency from the sensor device during transmission of the sensor information to the server device, the transmission of the sensor information that is currently transmitted, and transmits the sensor information with the high degree of emergency to the server device by giving a priority to the sensor information with the high degree of emergency.

9. A transmission method of transmitting sensor information from a sensor device by way of a terminal device to a server device, the transmission method comprising:
transmitting, when the sensor information has been transmitted by a connection type from the sensor device, the sensor information to the server device by the terminal device having established communication with the sensor device; and
transmitting, when the sensor information has been transmitted by a broadcast type, the sensor information to the server device by any of terminal devices having received the sensor information; and determining, by the server device, a state of a subject based on the terminal device that has transmitted the sensor information transmitted by the connection type.

* * * * *